(12) United States Patent
Peckham et al.

(10) Patent No.: US 10,651,424 B2
(45) Date of Patent: May 12, 2020

(54) OLED MICROCAVITY DESIGN AND OPTIMIZATION METHOD

(71) Applicant: Avalon Holographics Inc., St. John's (CA)

(72) Inventors: Jordan Peckham, Portugal Cove-St. Phillips (CA); Jennifer Campbell, St. John's (CA); Jiaqi Cheng, St. John's (CA)

(73) Assignee: Avalon Holographics Inc., St. John's (CA)

( * ) Notice: Subject to any disclaimer, the term of this patent is extended or adjusted under 35 U.S.C. 154(b) by 0 days.

(21) Appl. No.: 16/409,281

(22) Filed: May 10, 2019

(65) Prior Publication Data

US 2019/0273222 A1 Sep. 5, 2019

Related U.S. Application Data

(62) Division of application No. 15/909,968, filed on Mar. 1, 2018, now Pat. No. 10,340,480.

(51) Int. Cl.
*H01L 51/52* (2006.01)
*H01L 51/56* (2006.01)
*G06F 30/23* (2020.01)
*G06F 111/10* (2020.01)

(52) U.S. Cl.
CPC .......... *H01L 51/5265* (2013.01); *G06F 30/23* (2020.01); *H01L 51/5271* (2013.01); *H01L 51/56* (2013.01); *G06F 2111/10* (2020.01)

(58) Field of Classification Search
CPC .................................................... H01L 51/5265
See application file for complete search history.

(56) References Cited

U.S. PATENT DOCUMENTS

2008/0034866 A1* 2/2008 Kilic ...................... G01H 9/004
73/514.26
2010/0194261 A1* 8/2010 Sakano ............... G06F 17/5009
313/325

* cited by examiner

*Primary Examiner* — Raj R Gupta

(57) ABSTRACT

Control of the emission characteristics of a light source in a light field display poses a significant benefit in the resulting 3D display quality for current and future technologies. A design system for microcavity OLEDs of any wavelength is detailed, which combines theoretical background with FDTD optimizations, permitting microcavity design of any OLED configuration. The resulting output profiles for microcavity OLEDs designed and fabricated with this method are compared to standard OLEDs and provide a reduction in spectral bandwidth, and a decrease in angular output.

11 Claims, 15 Drawing Sheets

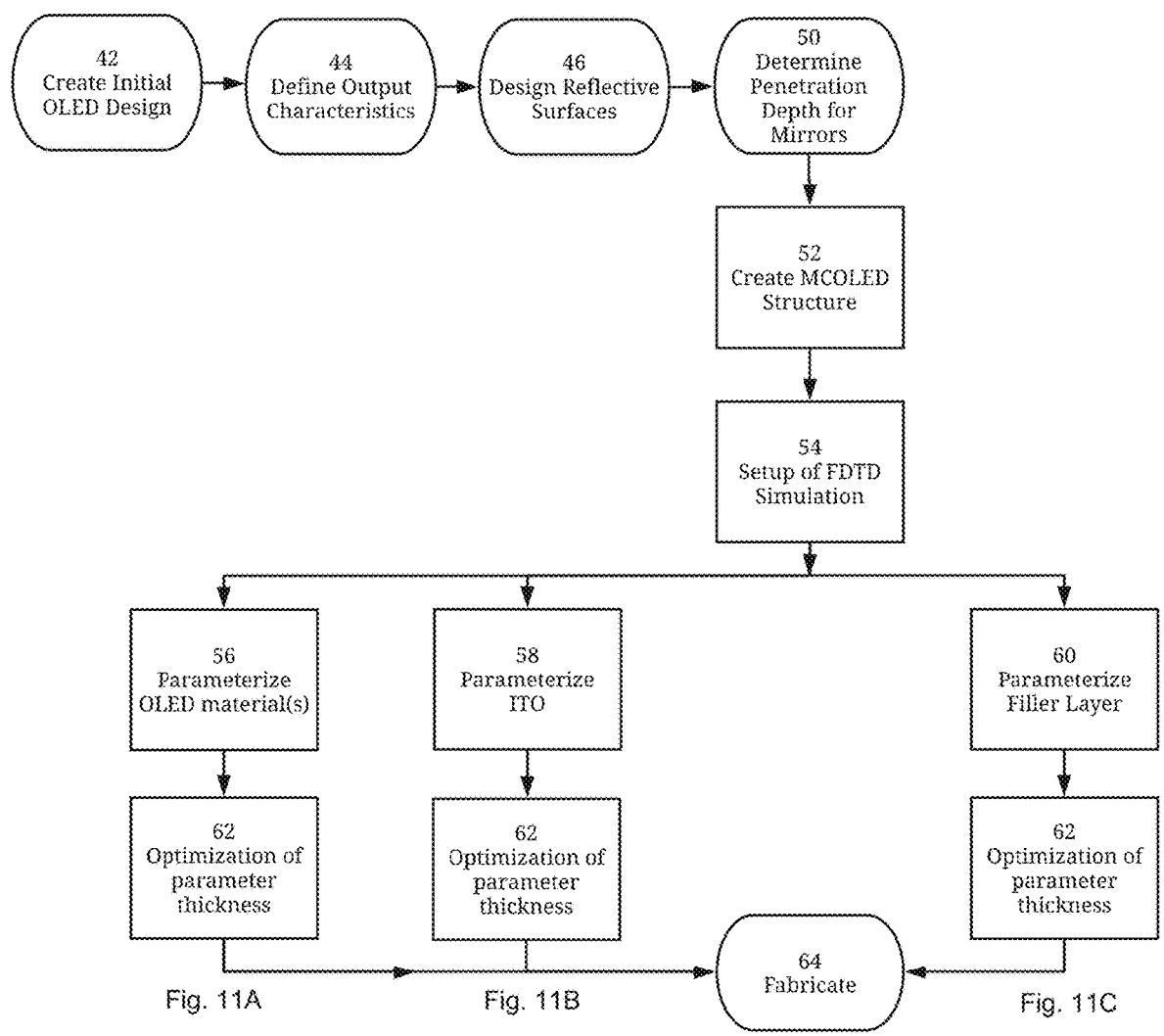

OLED MICROCAVITY DESIGN AND OPTIMIZATION METHOD

CLAIM OF PRIORITY

This application is a divisional of and claims priority to U.S. patent application Ser. No. 15/909,968, filed on Mar. 1, 2018, the entire contents of which is incorporated here by reference.

FIELD OF THE INVENTION

The present disclosure relates to organic light-emitting diode (OLED) devices, and more particularly, an OLED microcavity design process for a high angular resolution, wide field of view, multiple view display.

BACKGROUND OF THE INVENTION

Light field displays provide multiple views, allowing a user to receive a separate view in each eye. While current displays in this category provide an interesting viewing experience, a captivating light field display requires a very high pixel density, very low angular separation between views, and a large viewing angle. It is desired that a user experiences smooth transitions between viewing zones, while maintaining an independent and perceivable view from the adjacent views. A fundamental requirement in achieving these viewing parameters is controlling the output characteristics of the emission source. Organic light-emitting diodes (OLEDs) bound in a microcavity allow control of the spectral bandwidth and output angle of the resulting light.

Organic light-emitting diodes consist of thin-film layers of organic material coated upon a substrate, generally made of glass, between two electrodes. OLEDs have a characteristic broad spectral width and Lambertian intensity distribution profile. The thin-film layers disposed between the anode and cathode commonly include one or more of an Organic Hole-Injection Layer (HIL), an Organic Hole-Transporting Layer (HTL), an Emissive Layer (EML), an Organic Electron-Transporting Layer (ETL), and an Organic Electron-Injection Layer. Light is generated in an OLED device when electrons and holes that are injected from the cathode and the anode (electrodes), respectively, flow through the ETL and the HTL and recombine in the EML.

A method for controlling the output characteristics of light is the use of a microcavity. The microcavity is formed between two mirrors. The first mirror can be a metal cathode and the second mirror may be a layered stack of non-absorbing materials. The layered stack of non-absorbing materials is referred to as a distributed Bragg reflector (DBR). A DBR is an optical mirror comprised of multiple pairs of two different dielectric layers with different refractive indices in an alternating order. The highest reflectivity is attained when the layer thicknesses are chosen such that the optical path length of each layer is one quarter of the resonance wavelength, commonly referred to as the Bragg Wavelength, $\lambda_{Bragg}$. Three main design variables affecting the output characteristics of a microcavity are the reflectance of the top and bottom surfaces (i.e. opposing mirrors), and the optical path length. The optical path length between the mirrors is to equal a multiple of the wavelength. The wavelength of the light output by such resonant OLED structure is dependant, in part, upon this optical path length of the microcavity. The optical path length in the cavity can be manipulated in different ways, one of which is changing the thickness of the layers that make up the microcavity. A challenge for OLEDs, which are suitable for light-field displays, is how to determine the optimum optical path length of the microcavity to decrease the spectral bandwidth and output angle.

The current design process for microcavity OLEDs, as known in the prior art, includes creating the initial OLED design, defining the output characteristics, designing the reflective surfaces and determining the material thicknesses. The OLED is then fabricated and tested. This process is repeated until the desired output is attained from the fabricated OLED structure. This is a time consuming and costly process.

U.S. Pat. No. 6,917,159 B2 (microcavity OLED device) describes the use of a microcavity within an OLED to improve efficiency and intensity of output. Metallic mirrors are used instead of DBRs as they are easier to fabricate. This results in greater energy lost and less control of the reflectance. As metallic structures are used for both reflectors, one must be semi-transparent. This is to improve the output efficiency on the OLED and improve the chromaticity, however, for fine-tuning the output parameters, the fabrication of the semi-transparent electrode/reflector would need to be very precise to be able to control the reflectance. Also, the reflectance has a maximum value which is lower then achievable by a DBR since the metal will absorb some of the energy.

Patent publication WO2017051298A1 (Distributed Bragg Reflector on Color Conversion Layer with Microcavity for Blue OLED Lighting Application) describes the fabrication techniques and geometries categorized by device components. This patent publication refers to the fabrication and design for blue OLEDs only. An unknown OLED deposition process is applied for the DBR and the structure includes the combination of inorganic and organic layers to create a bottom emitting device with a flexible substrate and the pixels here are controlled using a passive matrix.

U.S. Pat. No. 7,489,074 (Reducing or Eliminating Color Change for Microcavity OLED Devices) and US 2006/0066220 A1 (Reduction or Elimination of Color Change with Viewing Angle for Microcavity Devices) disclose a multi-layered mirror structure at the bottom of the OLED structure, resulting in a bottom-emitting device. The structure of the OLED includes the use of two electrodes on either side of the emission layer. The disclosed device includes a light modulation thin film on a front surface of the substrate, one of which is a microstructure that redistributes wavelengths so the outputted emission spectrums have the same perceived color.

SUMMARY OF THE INVENTION

The present invention relates to methods for designing and making an organic light-emitting diode (OLED) device for red, green, or blue (R, G, or B individually, or RGB collectively) light emission comprising a metal reflective surface, which doubles as a cathode, and an opposing reflective surface comprising a distributed Bragg reflector (DBR). The methods are exemplified for the design and making of top-emitting microcavity OLEDs configured for use in a light field display, wherein the DBR design is an alternating stack of dielectric materials of specific thicknesses ensuring the optical path length of the microcavity is a quarter of the designed wavelength and suitable for use with an OLED of any colour.

The current microcavity OLED design process known in the art consists of the creation of the initial OLED design.

The desired output characteristics are then specified, reflective surfaces are designed, material thicknesses are defined, and an initial OLED is fabricated. Upon testing of the fabricated OLED, the process is repeated until the resultant fabricated OLED produces the desirable output parameters. A schematic of this process is shown in FIG. 10. The present disclosure provides a method of optimizing the design of a microcavity OLED with the implementation of FDTD simulation prior to fabrication to eliminate the need for iterative fabrication of MCOLEDs until the desired design/performance is achieved for commercial fabrication and application (see FIG. 11).

According to one aspect there is provided a microcavity OLED comprising a stacked layer structure with a bottom reflective layer and distributed Bragg reflector (DBR) top layer configured to create a microcavity comprising:
a series of one or more organic layers stacked in between a cathode layer and an anode layer to form a top emitting OLED, and an optional filler layer abutting the DBR; wherein the DBR top layer is configured for use with a top emitting OLED tuned to emit a wavelength of light corresponding to a given colour, comprising sublayers of alternating dielectric material, each sublayer thickness providing an optical path length equal to one quarter of the Bragg wavelength.

In one embodiment of the microcavity OLED, the Bragg wavelength does not equal the wavelength of the light that the OLED is tuned to emit.

In another embodiment of the microcavity OLED, the DBR consists of six to twelve sublayers of alternating dielectric material.

In a further embodiment of the microcavity OLED, the DBR consists of three pairs of alternating dielectric material.

In still a further embodiment of the microcavity OLED, the sublayers of alternating dielectric material are made of titanium dioxide and silicon dioxide In yet another embodiment of the microcavity OLED, the DBR consists of three pairs of alternating titanium dioxide and silicon dioxide sublayers, has a Bragg wavelength of 500 nm and wherein each titanium dioxide sublayer is about 50 nm thick and each silicon dioxide sublayer is about 86 nm thick.

In a related embodiment of the microcavity OLED, the OLED emits red, green or blue light.

According to another aspect there is provided a method of obtaining fabrication specifications and fabricating a specified microcavity OLED comprising a cathode and anode with organic layers disposed there between, an optional filler layer and a distributed Bragg reflector (DBR), wherein the method comprises the steps of:
  i. calculating optical path length and mirror reflectance approximations for the cathode and DBR, for a given set of microcavity OLED emission characteristics;
  ii. applying a FDTD simulation to determine the mirror penetration depths required for the microcavity OLED wavelength using the optical path length and mirror reflectance approximations;
  iii. applying a FDTD simulation to parameterize one or more material layers to be used to form the microcavity layers in between the reflective layers; and
  iv. using the results of the FDTD simulation to parameterize one or more material layers to determine the optimized thicknesses for the one or more materials layers and thereby provide fabrication specifications for the microcavity OLED.

In one embodiment of the method, the one or more material layers are organic layers.

In another embodiment of the method, the one or more material layers are anode layers In a further embodiment of the method, the one or more material layers are filler layers.

In still a further embodiment of the method, the step of applying a FDTD simulation to parameterize one or more material layers is based on a particle swarm optimization protocol.

In yet another embodiment of the method, calculating the mirror reflectance of the DBR is done using a transfer matrix protocol.

In another embodiment of the method, further comprising the step of fabricating the specified microcavity OLED.

In a further embodiment of the method, the specified microcavity OLED comprises a DBR configured for use with an OLED tuned to emit a wavelength of light corresponding to a given colour, the DBR comprising sublayers of alternating dielectric material, and each sublayer thickness providing an optical path length equal to one quarter of the Bragg wavelength.

In still a further embodiment of the method, the OLED is top-emitting.

In yet another embodiment of the method, the OLED emits red, green, or blue light.

In another embodiment of the method, the DBR consists of three pairs of alternating titanium dioxide and silicon dioxide sublayers, has a Bragg wavelength of 500 nm and wherein each titanium dioxide sublayer is about 50 nm thick and each silicon dioxide sublayer is about 86 nm thick.

BRIEF DESCRIPTION OF THE DRAWINGS

These and other features of the invention will become more apparent in the following detailed description in which reference is made to the appended drawings.

FIG. 11A: illustrates process schematic of the proposed method for the design and optimization of a microcavity OLED, focusing on the parameterization of the OLED (organic layers), according to the present disclosure.

FIG. 11B: illustrates an alternative process schematic of the proposed method for the design and optimization of a microcavity OLED, focusing on the parameterization of the ITO (anode), according to the present disclosure.

FIG. 11C: illustrates an alternative process schematic of the proposed method for the design and optimization of a microcavity OLED, focusing on the parameterization of the filler layer, according to the present disclosure.

FIG. 12: illustrated the range of DBR period (Λ) structures that are suitable for a top-emitting microcavity OLED used in a light-field display.
  a.

FIG. 13: illustrates a comparison of spectral output of a standard OLED and microcavity based OLEDs.
  a.

DETAILED DESCRIPTION OF THE INVENTION

Figure 1:
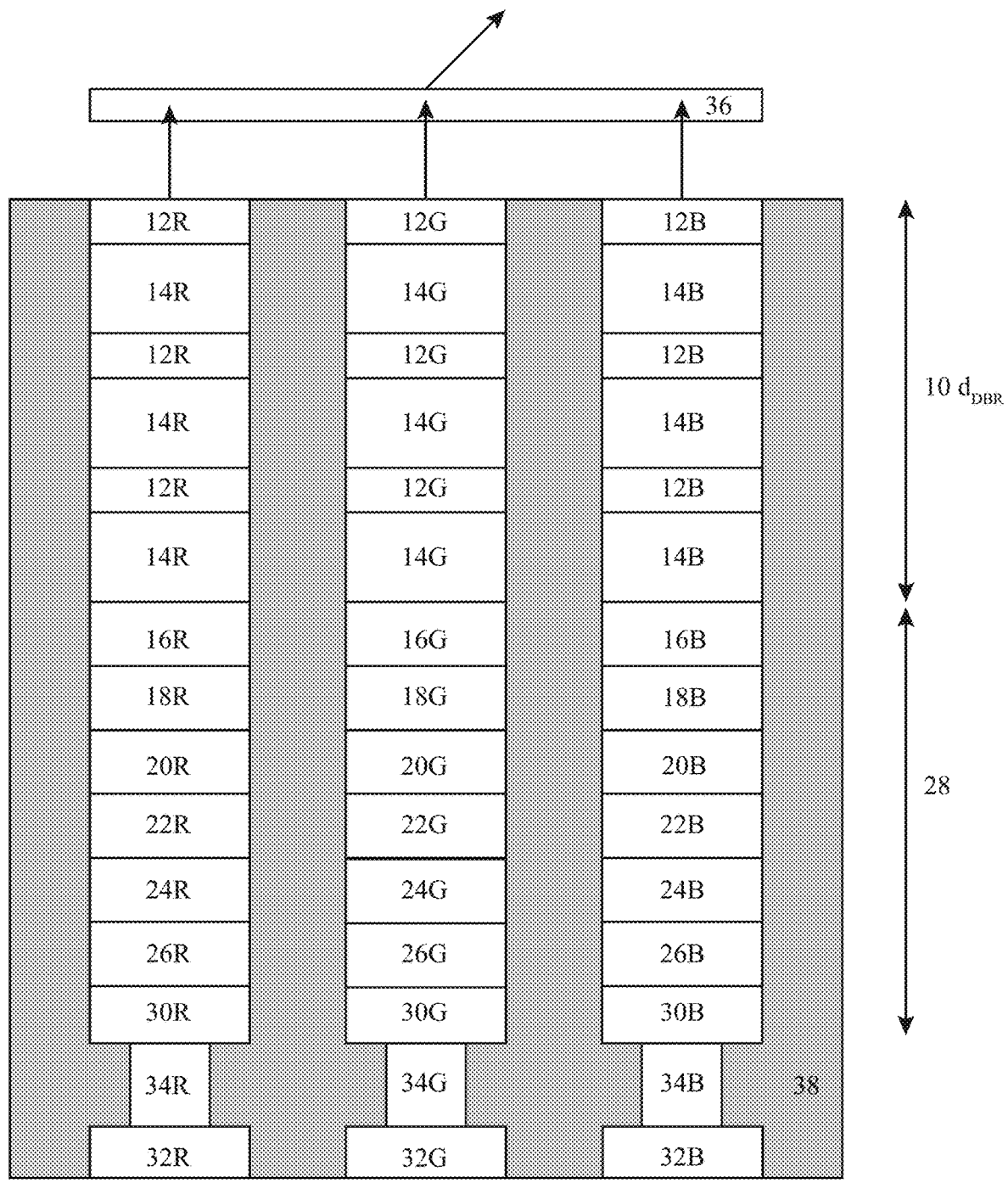
FIG. 1: illustrates a directional pixel configuration for use in a light field display applying microcavity OLED structures above a pixel circuit connected by a via. The distributed Bragg reflector (DBR) is above the OLED materials, separated by a filler layer as needed to create the proper optical cavity length 28.

The present disclosure relates generally to microcavity OLED design methods, including FDTD optimization, to control the emission of characteristics of a light source in a light field display.

Various features of the invention will become apparent from the following detailed description taken together with the illustrations in the Figures. The design parameters, design method, construction, and use of the microcavity OLED design process and structures disclosed herein are described with reference to various examples representing embodiments which are not intended to limit the scope of the invention as described and claimed herein. The skilled technician in the field to which the invention pertains will appreciate that there may be other variations, examples and embodiments of the invention not disclosed herein that may be practiced according to the teachings of the present disclosure without departing from the scope and spirit of the invention.

Definitions

Unless defined otherwise, all technical and scientific terms used herein have the same meaning as commonly understood by one of ordinary skill in the art to which this invention pertains.

The use of the word "a" or "an" when used herein in conjunction with the term "comprising" may mean "one," but it is also consistent with the meaning of "one or more," "at least one" and "one or more than one."

As used herein, the terms "comprising," "having," "including" and "containing," and grammatical variations thereof, are inclusive or open-ended and do not exclude additional, unrecited elements and/or method steps. The term "consisting essentially of" when used herein in connection with a composition, device, article, system, use or method, denotes that additional elements and/or method steps may be present, but that these additions do not materially affect the manner in which the recited composition, device, article, system, method or use functions. The term "consisting of" when used herein in connection with a composition, device, article, system, use or method, excludes the presence of additional elements and/or method steps. A composition, device, article, system, use or method described herein as comprising certain elements and/or steps may also, in certain embodiments consist essentially of those elements and/or steps, and in other embodiments consist of those elements and/or steps, whether or not these embodiments are specifically referred to.

As used herein, the term "about" refers to an approximately +/−10% variation from a given value. It is to be understood that such a variation is always included in any given value provided herein, whether or not it is specifically referred to.

The recitation of ranges herein is intended to convey both the ranges and individual values falling within the ranges, to the same place value as the numerals used to denote the range, unless otherwise indicated herein.

The use of any examples or exemplary language, e.g. "such as", "exemplary embodiment", "illustrative embodiment" and "for example" is intended to illustrate or denote aspects, embodiments, variations, elements or features relating to the invention and not intended to limit the scope of the invention.

As used herein, the terms "connect" and "connected" refer to any direct or indirect physical association between elements or features of the present disclosure. Accordingly, these terms may be understood to denote elements or features that are partly or completely contained within one another, attached, coupled, disposed on, joined together, in communication with, operatively associated with, etc., even if there are other elements or features intervening between the elements or features described as being connected.

As used herein, the term "DBR" refers to a distributed Bragg reflector. A distributed Bragg reflector (DBR) is an optical mirror which is composed of multiple pairs of two different dielectric layers with different refractive indices in an alternative order [11]. The highest reflectivity is attained when the layer thicknesses are chosen such that the optical path length of each layer is one quarter of the resonance wavelength. With each layer having an optical path length of $\lambda_{Bragg}/4$, all reflections will add in phase, and the transmissivity will decrease exponentially as a function of mirror thickness. At longer or shorter wavelengths than the stopband, the reflections begin to add out of phase, therefore the total reflections decreases [Ref 04]. This gives a broad-band high-reflectivity region centered on the Bragg wavelength, called the stop band, with oscillating side-lobes on either side [Ref 07]. The DBR is generally composed of pairs of two different dielectric layer with different refractive indices, but may also be composed of multiple dielectric materials or other transparent materials with a contrast in n, as long as the optical path length of each layer is $\lambda_{Bragg}/4$.

The multilayer mirror consists of alternating layers of substantially non-absorbing materials of appropriately chosen thickness. Typically, each layer is of thickness $$\frac{\lambda}{4n},$$

where $\lambda$ is advantageously chosen to correspond approximately to the center wavelength of the EML emission spectrum, e.g., 500-550 nm. Such mirrors are well known. The reflectivity of the mirror depends in a known way on the number of layer pairs, layer thickness and the refractive index of the materials used. Exemplary material pairs in the visible wavelength region are $Si_3N_4$, $SiO_2$, and $TiO_2$.

As used herein, the term "ITO" refers to Indium Tin Oxide, is typically encountered as an oxygen-saturated composition with a formulation of 74% In, 18% O2, and 8% Sn by weight. ITO is commonly used as an anode material in an OLED structure due to its suitable conductivity, it can be deposited by established methods, and it is nearly transparent and colorless and is a material that can be used to construct the anode layer in OLEDs according to the present disclosure.

As used herein, the term "pixel" refers to a light source and light emission mechanism used to create a display.

As used herein, the term "subpixel" is comprised of a light emitting device housed within an optical microcavity. The optical microcavity is operatively associated with a plurality of reflective surfaces to substantially collimate, manipulate or tune the light. At least one of the reflective surfaces is a light propagating reflective surface connected to the optical microcavity to propagate the light out of the microcavity. The present disclosure provides individually addressable red, green, and blue (RGB) subpixels. The subpixel size is reduced to a range from the nanoscale to several microns, significantly smaller than the pixel size previously known in the art.

As used herein, the term "light field" at a fundamental level refers to a function describing the amount of light flowing in every direction through points in space, free of occlusions. Therefore, a light field represents radiance as a function of position and direction of light in free space. A light field can be synthetically generated through various rendering processes or may be captured from a light field camera or from an array of light field cameras.

As used herein, the term "light field display" is a device which reconstructs a light field from a finite number of light field radiance samples input to the device. The radiance samples represent the color components red, green and blue (RGB). For reconstruction in a light field display, a light field can also be understood as a mapping from a four-dimensional space to a single RGB color. The four dimensions include the vertical and horizontal dimensions of the display and two dimensions describing the directional components of the light field. A light field is defined as the function:

$$LF:(x,y,u,v) \rightarrow (r,g,b)$$

For a fixed $x_f$, $y_f$, $LF(x_f, y_f, u, v)$ represents a two-dimensional (2D) image referred to as an "elemental image". The elemental image is a directional image of the light field from the fixed $x_f$, $y_f$ position. When a plurality of elemental images are connected side by side, the resulting image is referred to as an "integral image". The integral image can be understood as the entire light field required for the light field display.

As used herein, the term "FWHM" refers to full width half maximum, which is an expression of the extent of a function given by the difference between the two extreme values of the independent variable at which the dependent variable is equal to half of its maximum value.

As used herein, the term "OLED" refers to an Organic Light Emitting Diode, which is an opto-electronic device which emits light under the application of an external voltage. OLEDS can be divided into two main classes: those made with small organic molecules and those made with organic polymers. An OLED is a light-emitting diode in which the emissive electroluminescent layer is a film of organic compound that emits light in response to an electric current. Generally, an OLED is a solid-state semiconductor device [Ref. 14] comprised at least one conducting organic layer disposed between and electrically connected to an anode and a cathode. When a current is applied, the anode injects holes and the cathode injects electrons into the organic layers. The injected holes and electrons each migrate toward the oppositely charged electrode. When an electron and hole localize on the same molecule, an exciton, which is localized electron-hole pair having an excited energy state, is formed. Light is emitted when the exciton relaxes via a photoemissive mechanism.

Types of OLEDs include, but are not limited to [Ref. 14]
a. Active-matrix OLEDs (AMOLED)
  AMOLEDs have full layers of cathode, organic molecules and anode. The anode layers have a thin film transistor (TFT) plane in parallel to it so as to form a matrix. This helps in switching each pixel to it's on or off state as desired, thus forming an image. Hence, the pixels switch off whenever they are not required or there is a black image on the display, this increases the battery life of the device. This is the least power consuming type among others and also has quicker refresh rates which makes them suitable for video as well. The best uses for AMOLEDs are computer monitors, large-screen TVs and electronic signs or billboards.
b. Top-emitting OLEDs
  Top-emitting OLEDs have a substrate that is either opaque or reflective. Top-emitting OLEDs are better suited for active-matrix applications as they can be more easily integrated with a non-transparent transistor backplane. Manufacturers may use top-emitting OLED displays in smart cards.

c. Bottom-emitting OLEDs

An OLED is bottom-emitting if the emitted light passes through the transparent or semi-transparent bottom electrode and substrate.

As used herein, the term "microcavity" refers to a structure formed by reflecting faces on the two sides of a spacer layer or optical medium, such as an OLED.

As used herein, the term "microcavity OLED" (MCOLED) refers to the materials of an OLED, as previously described, bound in a microcavity defined by two reflective surfaces, in which the reflective surfaces can be metallic materials, dielectric materials arranged in such a way to reflect light within a specific range, or some combination of dielectric and metallic materials. The organic materials which make up the OLED are arranged with material thicknesses $d_j$ which have and optical path length of $L_j$, where $L_j = n_j \times d_j$, where $n_j$ is the refractive index of the OLED material. The sum of the optical path length of the materials between the reflective surfaces is designed to equal $$\frac{m\lambda_i}{2}$$

where $\lambda_i$ is the peak design wavelength of the MCOLED. The optical path length can therefore be changed by changed the thickness of one, or all the materials between the reflective surfaces, or adding an additional filler material. The use of a microcavity in an OLED structure decreases the spectral width of the OLED, decreases the angular output, therefore increasing the overall efficiency.

As used herein, the term "cathode" refers to the negatively charged electrode by which electrons enter an electrical device.

As used herein, the term "anode" refers to the positively charged electrode by which the electrons leave a device.

As used herein, the term "simulation" refers to the production of a computer model of something, especially, for the purpose of study or to develop and refine fabrication specifications. The finite-difference time-domain (FDTD) method is used to solve problems in electromagnetics and photonics, solving Maxwell's equations in complex geometries. FDTD is a versatile finite difference method in the time domain which treats nonlinear material properties in a natural way and allows a user to measure the system response over a wide range of frequencies. A comparable technique is Rigorous Coupled Wave Analysis (RCWA), which is a semi-analytical method, generally employed to solve field diffraction problems of a periodic structure. RCWA decomposes fields into a set of plane waves, representing the fields by a sum of spatial harmonics in Fourier-space. RCWA benefits from a decreased simulation complexity and time but suffers inaccuracy for more complex geometries.

As used herein, the term "mirror" refers to an object that reflects light in such a way that, for incident light in some range of wavelengths, the reflected light preserves many or most of the detailed physical characteristics of the original light, called specular reflection. If two or more mirrors aligned exactly parallel and facing each other can give an infinite regress of reflections, called an infinity mirror effect.

As used herein, the term "metasurface" is defined as thin optical components that rely on subwavelength resonators to modify the optical response of an interface. This resonant nature introduces an abrupt phase shift in the incident wavefront, making it possible to mold the scattered wavefront [Ref. 15]. Any desired functionality requires constructive interference between multiple light paths separating the interface and the desired wavefront.

As used herein, the term "transmissivity" is defined as the percentage of light transmitted per the incident light.

As used herein, the term "wavelength" is a measure of distance between two identical peaks (high points) or troughs (low points) in a wave, a repeating pattern of traveling energy such as light or sound.

It is contemplated that any embodiment of the compositions, devices, articles, methods and uses disclosed herein can be implemented by one skilled in the art, as is, or by making such variations or equivalents without departing from the scope and spirit of the invention.

Design Considerations for OLEDs—Materials

Figure 14:
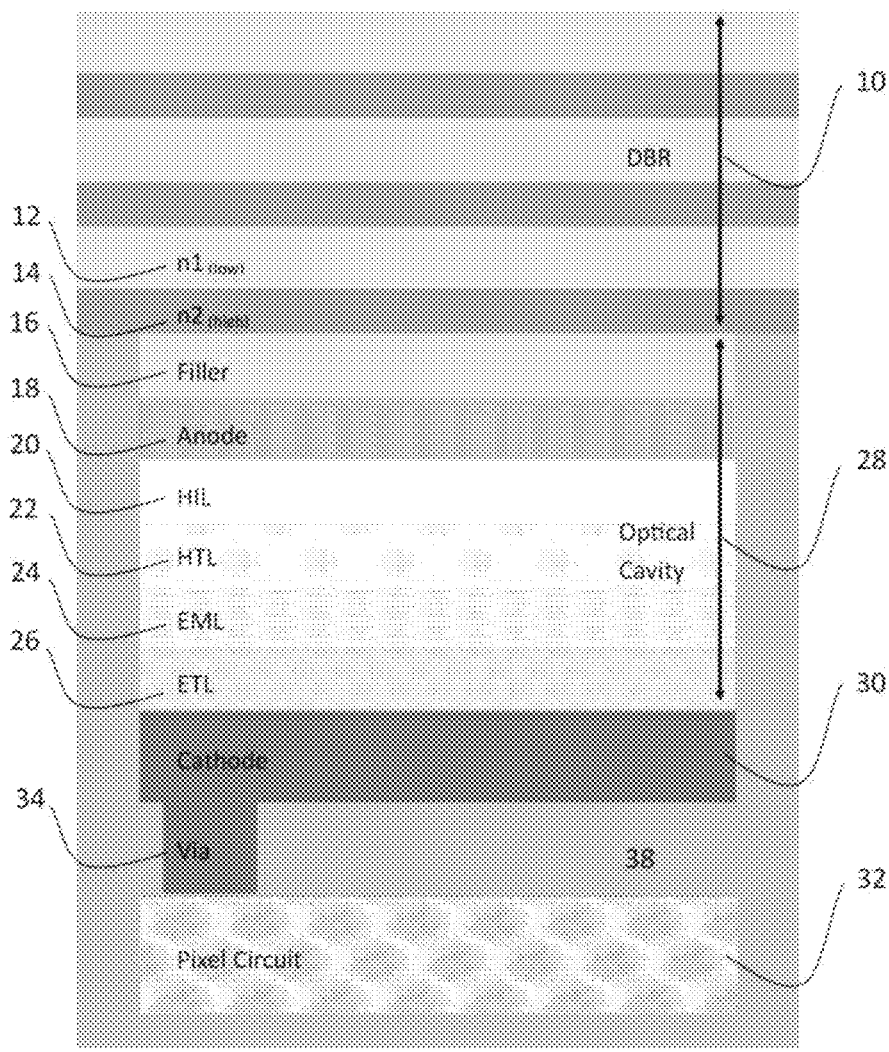
FIG. 14: illustrates a graphical representation of the microcavity organic light emitting diodes (OLEDs) in accordance with various embodiments of the present disclosure.

An organic light emitting diode (OLED) structure, as seen in FIG. 14, typically includes a substrate 38 made of glass; a transparent anode made of ITO 18, where the index of refraction (n) of the ITO is approximately 1.8; a hole transport layer (HTL) 22 with an index of refraction (n) of approximately 1.5; an electron transport layer (ETL) 26 and an emissive layer (EML) 24 with n values of approximately 1.7; and a cathode. Materials are selected for each of these components to achieve the required n values.

The electron transport layer (ETL) 26 can be any substantially transparent material that can facilitate electron transport from the relevant electrode to the emission layer. Examples of such materials include 2-(4-biphenyl)-5-phenyl-1,3,4-oxadiazole (PBD), butyl PBD, or either of these previously mentioned materials doped in an inert polymer such as poly(methyl methacrylate) (PMMA) or a poly (carbonate).

Emission layer (EML) 24 materials include Alq, aromatic hydrocarbons, poly(phenylene vinylenes), oxadiazole and stilbene derivatives. The EML 24 material optionally can be a stable non-emissive host material doped with an emissive material which has an energy gap that is less than that of the primary component of the EML 24 material.

The hole transport layer (HTL) 22 can be any substantially transparent material that can facilitate the transport of holes to the EML 24 layer, where electron-hole recombination takes place. Examples of suitable materials are diamines (e.g., N, N'-diphenyl-N,N'-bis (3-methylphenyl)-1,1'-biphenyl-4,4'-diamine) and poly(phenylene vinylenes).

The anode 18 is generally indium tin oxide (ITO) or a conducting polymer such as doped polyaniline, or a thin layer (e.g., about 10 nm) of metal (e.g., Au or Al), and may be unpatterned or patterned (e.g., into rows or columns).

The filler layer 16 can be any substantially transparent material that is chemically stable under the manufacturing and operating conditions and that can be patterned by an appropriate technique. Exemplary filler materials are transparent polymers (e.g., a polyimide) or transparent inorganic dielectrics (e.g., $Si_3N_4$ or $SiO_2$).

In a top-emitting configuration of the OLED, the substrate 38 need not be transparent. It can be metal (with an appropriate insulator) or a semiconductor, e.g., Silicon.

Microcavity OLED Design Factors and Configurations

The path to creating a 3D display that mimics the real world includes decreasing source dimensions. Inorganic light emitting diodes (LED) are not suitable for miniaturization into the sub-micron regime due to several obstacles including fabrication challenges and quantum confinement related changes in band structure. Organic light emitting diodes (OLED), on the other hand, present a possible alternative because their amorphous structure is not bound by quantum confinement [01]. In addition, OLEDs with sub-100 nm diameters have been fabricated and exhibit similar performance to larger area OLEDs [02].

Spectral narrowing, intensity enhancement, and emission profile modification of microcavity OLEDs (MCOLED) are a well reported result of the spontaneous emission of planar microcavity devices. The three main design variables affecting the performance of a microcavity are the reflectance of the top and bottom surfaces, and the optical path length. Therefore, by specifically fixing the distance between the reflective surfaces, attaining a high reflectance value for one of the mirrors, and finely controlling the reflectance of the opposing mirror, the output of each OLED can be finely tuned. In this disclosure, the cathode 30 functions as both bottom reflective surface in the microcavity structure, as well as the base electrical contact, as illustrated in FIG. 14. The upper reflective surface is comprised of a series of alternating high 14 and low 12 refractive index dielectric layers known as a distributed Bragg reflector (DBR). The DBR is selected to allow tailoring of the output parameters, since the refractive index properties of the constituent materials and the number of pairs of the dielectric layers change the peak reflectance and reflectance profile of the dielectric layered mirror, with the additional benefit of no absorption in the visible spectrum.

An organic light emitting diode consists of multiple organic material layers, between a pair of electrodes, resulting in characteristic broad spectral width and Lambertian intensity profile emission. While these emission characteristics may be desirable for standard display solutions, the ability to tailor the optical properties of the device for a light field display using microcavity effects is required.

For a complex MCOLED design, the implementation of an optimization method in the design stage results in the fabrication of an MCOLED structure with decreased variation from the design. This reduces the redesign and subsequent fabrication processes required to produce the MCOLED with the desired output.

For example, an embodiment of the present disclosure includes a common DBR structure for R, G, and B subpixels. The DBR is designed so the reflectance results in the optimum optical path length, $L_i$, in the microcavity. The DBR layer thicknesses are designed such that the overall thickness of the DBR ($d_{DBR}$) 10 results in the optimal optical path length. As a consistent DBR structure is used for each subpixel (R, G, and B), the design of the DBR becomes increasingly complex to ensure the optimum optical path length, $L_i$, for each subpixel is achieved. The implementation of the optimization of the design of the MCOLED using FDTD simulation resulted in a common DBR design that resulted in the required optical path length for each subpixel.

In this disclosure, the development of and the resulting microcavity based OLEDs are detailed. The theoretical design variables used to define the initial structure of the OLEDs at the peak emission wavelength are summarized. FDTD simulations used to optimize the optical path lengths in the microcavity are detailed. Fabricated MCOLEDs, based on specifications from FDTD simulation are presented and compared to OLEDs not bound in a microcavity, as well as FDTD simulation results.

Finite-difference time-domain (FDTD) is a state of the art time-domain technique, in which a single simulation can incorporate multiple frequency points, providing the ability to analyse and optimize device design across a wide wavelength range. Current applications of FDTD methods include design of image sensors, solar cells, and metamaterials. For OLED design, FDTD solutions are currently incorporated in the design process to increase the output efficiency by optimizing extraction layers and to define layer thicknesses to avoid microcavity based effects, which are not desirable.

Figure 10:
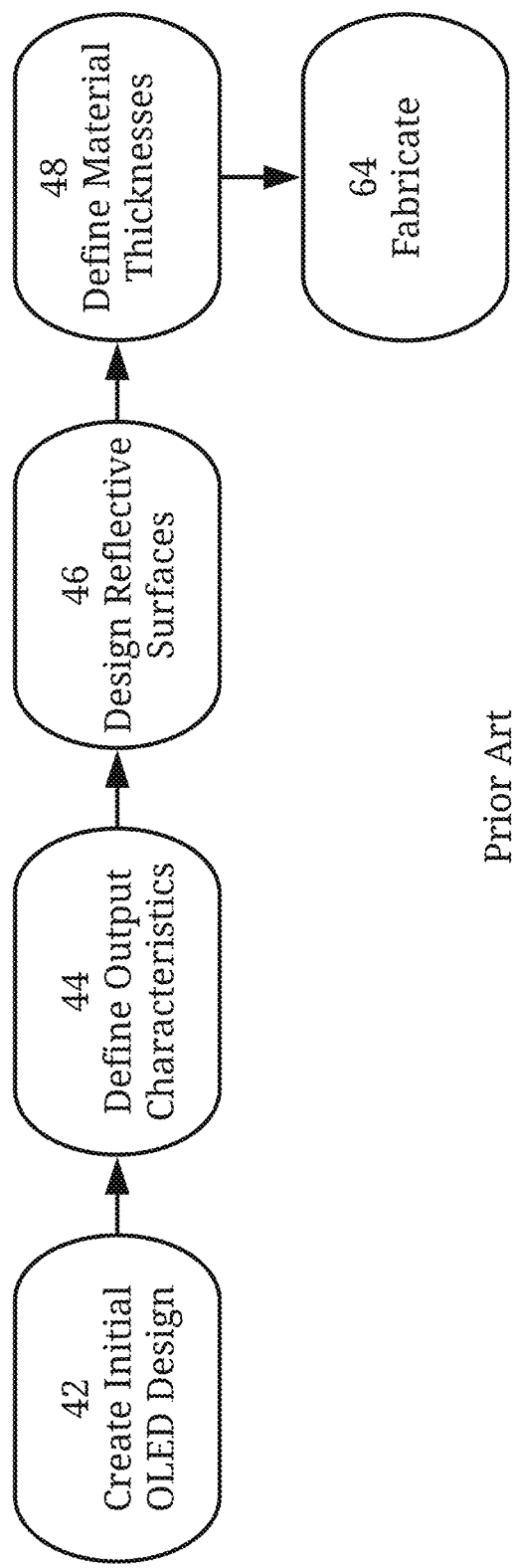
FIG. 10: illustrates a process schematic outlining the design process for microcavity OLEDs as previously known in the art.
Figure 12A:
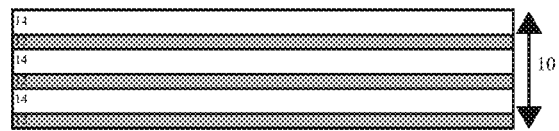
FIG. 12A: illustrates the DBR structure of the present disclosure with a period, Λ=3. The number of layers in the DBR can be increased, defined in periods, Λ, which constitute one (14) high refractive index and one (12) low refractive index layer, and/or the difference in the refractive index of the DBR materials can be increased
  b.
Figure 12B:
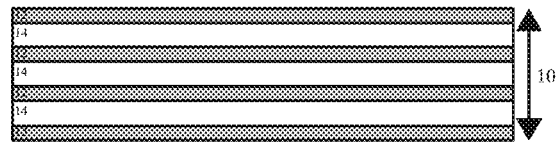
FIG. 12B: illustrates a DBR structure of the present disclosure with a period, Λ=3.5.
  c.
Figure 12C:
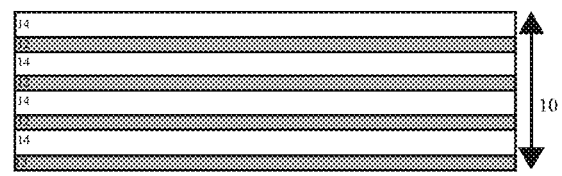
FIG. 12C: illustrates a DBR structure of the present disclosure with a period, Λ=4.
  d.
Figure 12D:
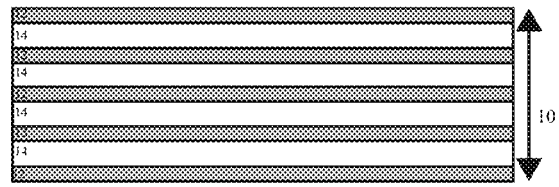
FIG. 12D: illustrates a DBR structure of the present disclosure with a period, Λ=4.5.
  e.
Figure 12E:
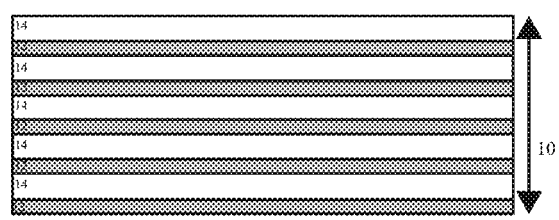
FIG. 12E: illustrates a DBR structure of the present disclosure with a period, Λ=5.
  f.
Figure 12F:
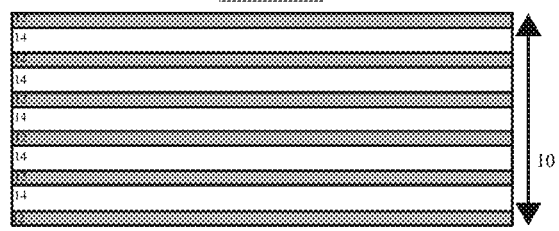
FIG. 12F: illustrates a DBR structure of the present disclosure with a period, Λ=5.5.
  g.
Figure 12G:
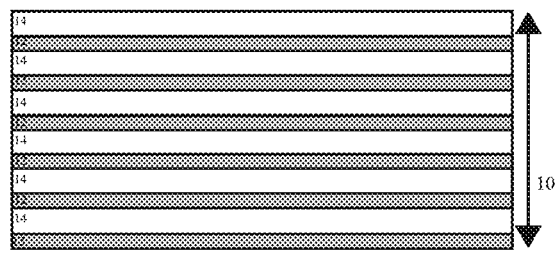
FIG. 12G: illustrates a DBR structure of the present disclosure with a period, Λ=6.

FIG. 10 illustrates the method for the design of a microcavity OLED (MCOLED) as previously known in the art. The process includes the creation of the initial OLED design 42, defining the desired output characteristics 44, design of the reflective surfaces 46, and the definition of the material thicknesses 48. The next step, as known in the art, is fabrication of the MCOLED 64. Once fabrication is complete, the microcavity OLED will undergo testing and the process is repeated from 42 through to fabrication until the desired output is attained.

FIG. 11 illustrates a process schematic of the proposed method for the design and optimization of a microcavity OLED, according to the present disclosure. This method includes creation of the initial OLED design 42, defining the desired output characteristics 44, and design of the reflective surfaces 46.

For the present disclosure (FIG. 11) and the design of microcavity OLEDs with a DBR structure as previously known in the art (FIG. 10), the creation of the initial OLED design 42, requires the consideration of the theoretical design variables.

Theoretical Design Variables

When a light emitting material is placed between two reflective surfaces, the spontaneous-emission photon density of states is redistributed, resulting in an enhancement of emission intensity in the perpendicular direction as well as in narrowing of the emission spectra [Ref. 12]. This enhancement occurs when the total optical path length, $L_i$, satisfies the relationship [Ref. 05]

$$L_i = \frac{m\lambda_i}{2} \quad (1)$$

Where m is a positive integer and $\lambda_i$ is the wavelength of peak emission from the cavity [Ref. 06].

Emission Characteristics

The reduced angular spread due to the microcavity can be approximated as $$\delta\theta_{FWHM} = \sqrt{\frac{2\lambda_i\left(1 - \sqrt{R_{Cathode}R_{DBR}}\right)}{\pi L_i \sqrt[4]{R_{Cathode}R_{DBR}}}} \quad (2)$$

And similarly, the FWHM of the output spectrum is determined as $$\delta\lambda_{FWHM} = \sqrt{\frac{\lambda_i^2\left(1 - \sqrt{R_{Cathode}R_{DBR}}\right)}{2\pi L_i \sqrt[4]{R_{Cathode}R_{DBR}}}} \quad (3)$$

Where $R_{Cathode}$ is the reflectance of the cathode, and $R_{DBR}$ is the reflectance of the DBR.

Distributed Bragg Reflector

The highest reflectivity of the DBR structure is attained when the layer thicknesses, $d_i$, are chosen such that the optical path length of each layer is one quarter of the resonance wavelength, or $$d_i = \frac{\lambda_{Bragg}}{4\,n} \quad (4)$$

Where $\lambda_{Bragg}$ is the design wavelength for the DBR, which can be any value but is chosen such that the reflectance is high in the wavelength range for the design [Ref. 11]. Under these conditions, all reflections will add in phase, and the transmissivity will decrease exponentially as a function of mirror thickness. The reflectance of a DBR at $\lambda_{Bragg}$ can be approximated as $$R_{DBR} = \left( \frac{1 - \left(\frac{n_1}{n_2}\right)^{2\Lambda}}{1 + \left(\frac{n_1}{n_2}\right)^{2\Lambda}} \right)^2 \quad (5)$$

Where $n_1$ is the refractive index of the low index DBR 12 at $\lambda_{Bragg}$, $n_2$ is the refractive index of the high index DBR material 14 at $\lambda_{Bragg}$, and $\Lambda$ is the number of dielectric pairs [Ref. 09]. At longer or shorter wavelengths, the reflections begin to add out of phase, therefore the total reflections decrease [Ref. 04]. The result is a broad-band high-reflectivity region centered on $\lambda_{Bragg}$, referred to as the stop band, $\delta\lambda_{sb}$ determined as $$\delta\lambda_{sb} = 2\frac{\lambda_{Bragg}(n_2 - n_1)}{\pi n_{eff}} \quad (6)$$

Where $n_{eff}$ is the effective index [Ref 07]. These are the theoretical design variables considered in the prior art for a microcavity OLED structure with a DBR, and similarly in the present disclosure. However, to enhance the output of the MCOLED and the MCOLED design, the present disclosure considers the optical path length of the microcavity, as represented in FIGS. 11A-C. The materials of the DBR can be any material which are not opaque in the wavelength range of the design. For example, in the visible wavelength range, materials such as silicon nitride, titanium dioxide, silicon dioxide, and other dielectrics may used.

Optical Path Length

The total optical path length of the microcavity is represented as $$L_i = L_{DBR} + L_{Organics} + L_{Cathode} \quad (7)$$

The sum of the penetration depth into the DBR, $L_{DBR}$, the optical path length in the OLED materials, $L_{Organics}$, and the penetration depth into the metal cathode, $L_{Cathode}$. The optical path length in the materials between the two reflective surfaces is found as the sum of the optical path lengths in each material, $$L_{Organics} = \sum_i^N n_i d_i \quad (8)$$

Where $n_i$ and $d_i$ are the layer indices and thicknesses, respectively. The penetration depth into the DBR can be determined as [Ref 05, 13].

$$L_{DBR} = \frac{\lambda_{Bragg}}{2} \frac{n_{eff}}{(n_2 - n_1)} \quad (9)$$

And the penetration depth into the metal cathode is $$L_{Cathode} = \left| \frac{\Phi_m}{4\pi} \lambda_i \right| \quad (10)$$

where $\Phi_m$ is the phase shift at the metal reflector, given by $$\Phi_m = \tan^{-1}\left( \frac{2n_{Cavity} k_{Cathode}}{n_{Cavity}^2 - n_{Cathode}^2 - k_{Cathode}^2} \right) \quad (11)$$

Where $n_{Cavity}$ is the refractive index of the organic in contact with the cathode, and $n_{Cathode}$ and $k_{Cathode}$ are the real and imaginary parts of the refractive index of the metal cathode [Ref 05].

The DBR structure in FIGS. 1-6 show alternating layered pairs of a dielectric material with a low refractive index 12 and a dielectric material with a high refractive index 14. The first layer of the DBR above the filler layer 16 can be either the material with the low refractive index 12 or the material with the higher index of refraction 14.

FIGS. 12 A-G illustrate the DBR structure of the present disclosure with a period ranging from, $\Lambda=3-6$, in increments of 0.5. The number of layers in the DBR can be increased, defined in periods, $\Lambda$, which constitute one high refractive index 14 and one low refractive index layer 14, and/or the difference in the refractive index of the DBR materials can be increased. The order in which the pairs can be arranged such that the material with the low refractive index 12 form the bottom layer of the DBR stack, with the higher refractive index material layer 14 situated on top, or reversely, the pairs can be arranged such that the material with the high refractive index 14 form the bottom layer of the DBR stack, with the lower refractive index material layer 12 situated on top.

As seen in FIG. 10, as previously known in the art, once the theoretical design variables have been determined 42-46, material thicknesses are defined 48 and the MCOLED structure is fabricated 64. This structure is then tested and compared to the design requirements. The theoretical design variables are recalculated 42-48 and subsequent MCOLED structures are fabricated 64 until the desired output is achieved.

In the present disclosure, the addition of an optimization method is introduced to reduce the recalculation of the theoretical design variables and in turn minimize the number of fabricated MCOLEDs prior to achieving the structure with the required design specifications. This optimization method is illustrated in FIG. 11A-C. The MCOLED structure is created (conceived) 52 and implemented into the setup of the FDTD simulation 54.

Design Methodology

For the general MCOLED design, where $\lambda_{Bragg}=\lambda_i$, the theoretical model presented in the previous section can be used to create the initial OLED design 42. This initial design 42 combined with the definition of the desired output 44, reflective mirror design 46, and the definition of the material thicknesses 48 will yield a satisfactory fabrication 64 result. However, when $\lambda_{Bragg} \neq \lambda_i$, these equations can only be used to provide an initial approximation of the required MCOLED design 42. Equation (9) cannot reliably be used to determine a value for the penetration depth into the DBR at a value other then $\lambda_{Bragg}$. The remainder of this section details the design procedure reported here for the case when $\lambda_{Bragg} \neq \lambda_i$ as shown in FIG. 11.

Initially, a series of approximations are used to estimate the optical path length and mirror reflectance, using the theoretical design method. An OLED design is specified 42, containing a set of material thicknesses 48 which are used in Equation (8) to determine the optical path length in the OLED materials. Assuming the same metal cathode is used as in this OLED design as in the microcavity design, the penetration depth can be calculated 50 using Equation (10). The thickness of the cathode is significantly increased in the microcavity design as compared to the OLED design 42 to prevent unwanted transmission. The final step in estimating the optical path length in the microcavity is the penetration into the DBR 50, which can be approximated as $\lambda_i$. Using Equation (1), the minimum mode number, m can be determined.

Defining the emission characteristics required of the MCOLED will determine the reflectance of the top and bottom mirrors 46. In the case where a metal mirror is used, the reflectance value is bound to an upper limit due to absorption. Using Equation (2) and/or Equation (3), the minimum reflectance for the DBR can be determined. With knowledge of the minimum reflectance, a script created in MATLAB, or other suitable software, based on a transfer matrix method (protocol) is used to determine the reflectance profile of the DBR. The transfer matrix method analyses the electromagnetic propagation through a periodic medium, using the continuity conditions from Maxwell's equations to determine the reflectance profile. An example of the output of this custom script is shown in both FIGS. 7 and 8.

Figure 8:
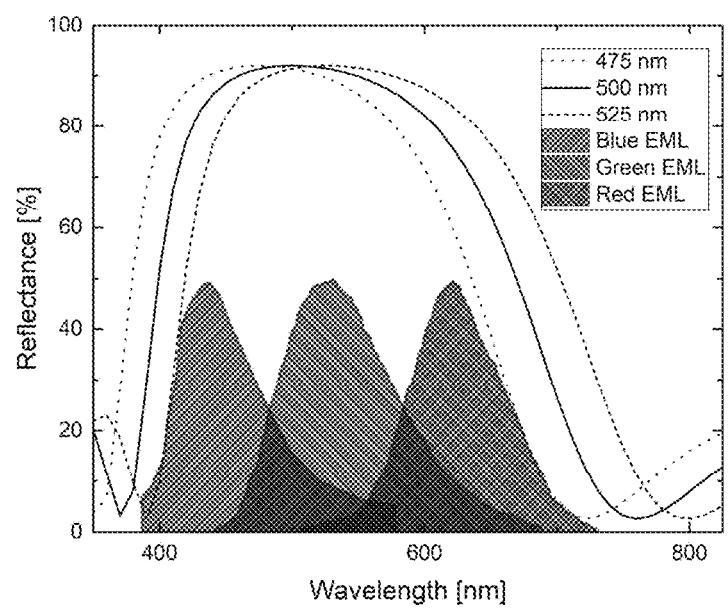
FIG. 8: illustrates wavelength versus reflectance for a 3-period distributed Bragg reflector for Bragg wavelengths, $\lambda_{Bragg}$, of 475 nm (dotted line), 500 nm (solid line), and 525 nm (dashed line). The expected output spectrum for red, green, and blue OLEDs is shown below the reflectance profiles of the DBR.

FIG. 8 illustrates wavelength versus reflectance for a 3-period distributed Bragg reflector for Bragg wavelengths, $\lambda_{Bragg}$, of 475 nm (dotted line), 500 nm (solid line), and 525 nm (dashed line). The expected output spectrum for red, green, and blue OLEDs is shown below the reflectance profiles of the DBR. The design requirements for a single DBR structure to be used for each subpixel include a reflectance of >75%, a stopband width greater than the emission spectrum of RGB OLEDs, ($\delta\lambda_{sub}$=240 nm). The design requirements for a single DBR structure to be used for each subpixel would include reflectance values of 80%, 85%, and 90%. A higher reflectance value reduces the angular output and the spectral bandwidth from the MCOLED. The center wavelength or Bragg wavelength, $\lambda_{Bragg}$, is defined such that reflectivity is maximum for each emission ($\lambda_{Bragg}$~500 nm).

Using the final design of the DBR 46, the penetration depth at the design wavelength for the MCOLED, $\lambda_i$, must be determined. Using Lumerical FDTD Solutions, a commercial-grade simulator based on the finite-difference time-domain method, the penetration depth is determined by measuring propagation length at $\lambda_i$ and comparing the result to a discrete mirror 50. A similar simulation is completed for the metal cathode to validate the calculation using Equation (10). These values can then be used in Equation (7) to define the initial model of the MCOLED 52.

A particle swarm optimization is employed to determine the final MCOLED structure, accounting for the entire wavelength range of the emitting layer in the OLED structure. The optimizations 56-60 to determine the required optical path length for each microcavity OLED 62 were created in FDTD Solutions, using a custom script to create the MCOLED structure. The script creates each layer thickness 56-60 as a variable which can then be optimized 62 by the simulation software. The refractive index and extinction coefficients for each material were initially measured by ellipsometry and/or supplied by the material supplier and imported into the simulation to ensure accurate results. It should be noted that there are many ways to optimize the structure, including adding a filler layer above the anode structure 60 which can be changed to tune the optical path length, similarly varying the anode thickness 58 can be used, or tuning one or all of the OLED material thicknesses 56.

FIG. 11A illustrates the process to parameterize the OLED material 56, therefore the model sweeps the thickness of the organic material and measures the resulting intensity across the entire wavelength. There are two figures of merit that are used: one is to maximize the intensity at the pre-defined resonant wavelength, and the other combines the intensity for all the wavelengths. It also minimizes the maximum-minimum wavelength range where the intensity is above the FWHM of the resonant wavelength.

Both have been used and limited comparison has shown alignment in the results of both methods. The desired results from this simulation fine-tune the thickness of the materials in the OLED stack 56 to maximize the output intensity and decrease the spectral bandwidth.

Once the optimization of parameter thicknesses 62 are complete, the MCOLED is fabricated 64 and tested. As seen in FIG. 11, this microcavity OLED design method allows the structure to be optimized 54-62 prior to fabrication 64 to avoid multiple redesign sequences 42-52 and fabrication 64 of the OLED structures.

FIG. 11B is an alternative process embodiment to FIG. 11A, which illustrates a process schematic of the proposed method for the design and optimization of a microcavity OLED, according to the present disclosure. This Figure illustrates the process to parameterize the Indium Tin Oxide (ITO) 58, therefore the model sweeps the thickness of the ITO layer and measures the resulting intensity across the entire wavelength.

FIG. 11C is an alternative process embodiment to FIG. 11A and FIG. 11B, which illustrates a process schematic of the proposed method for the design and optimization of a microcavity OLED, according to the present disclosure. FIG. 11C illustrates the process to parameterize the filler layer 60, therefore the model sweeps the thickness of the filler layer and measures the resulting intensity across the entire wavelength.

Experimental Results

Figure 7:
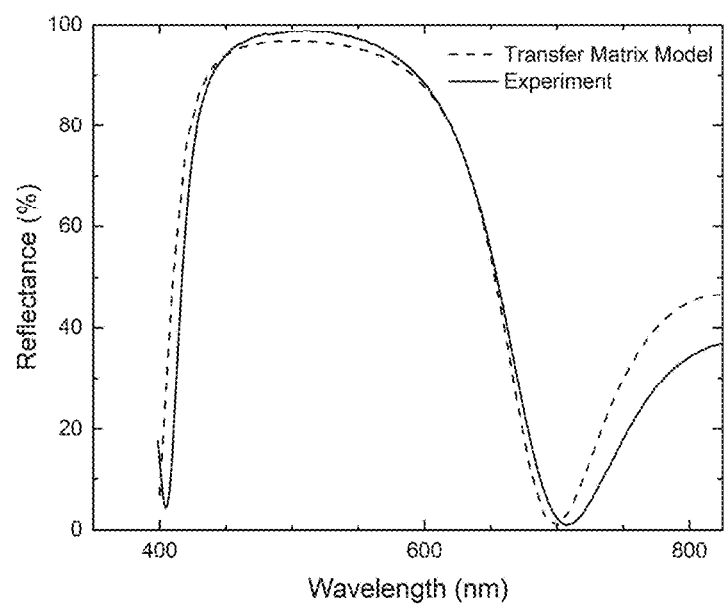
FIG. 7: illustrates a graphical representation of the reflectance as a function of wavelength for a 3-pair mirror, comparing the simulation and experimentally obtained reflectance profile. The dotted line represents the theoretical approximation of the reflectance profile, determined using a transfer matrix approximation. The solid line represents experimental data for the same DBR surrounded in air on a silicon substrate.

To confirm the transfer matrix model script used in step 52 of FIG. 11, a 3-period DBR on silicon was fabricated, shown in FIG. 7. The measured reflectance profile of the resulting DBR is plotted against the theoretically determined profile, showing very good agreement. The resulting stopband width is determined to be approximately 240 nm, with a maximum reflectance over 98%.

Figure 13A:
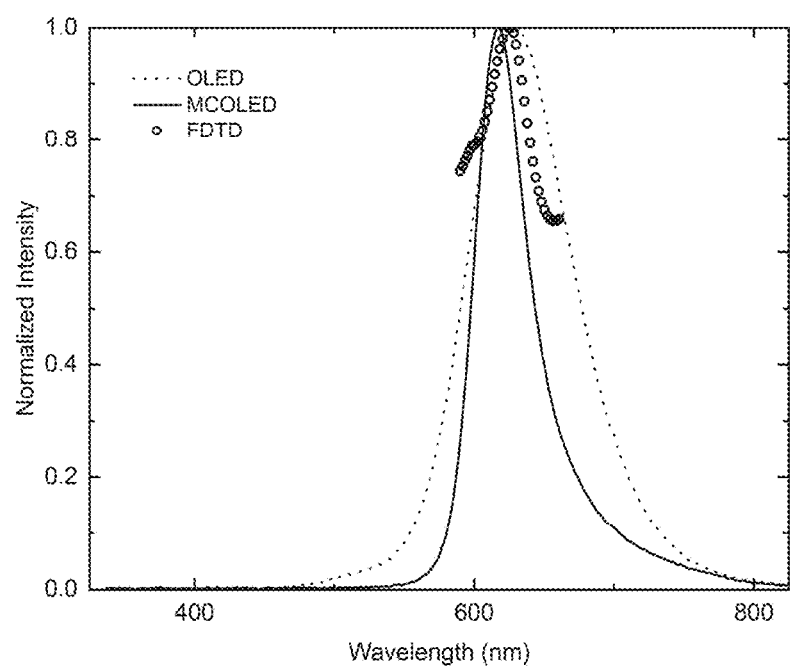
FIG. 13A: illustrates the red OLED as described in Example 1; the FWHM for the MCOLED is 46.7 nm, and for the standard OLED is 87.0 nm.
  b.
Figure 13B:
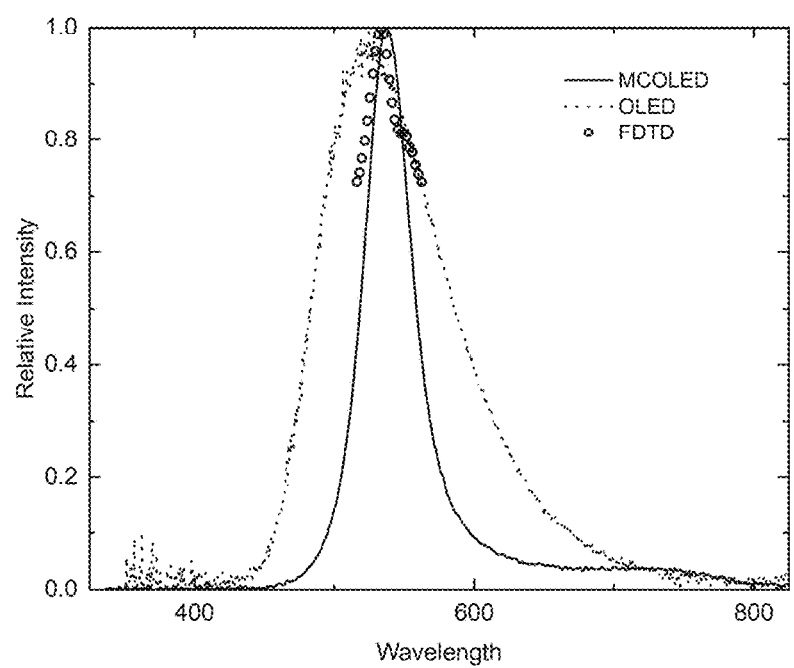
FIG. 13B: illustrates the green OLED as described in Example 2; the FWHM for the MCOLED is 40.4 nm, and for the standard OLED is 101.6 nm.

The resulting spectral output for a red and green OLED with a microcavity are shown in FIGS. 13A and 13B, respectively. The spectral output for the OLEDs was recorded using an Ocean Optics STS spectrometer. The FWHM values for each curve are determined by fitting a Gaussian function to the collected data and calculating the FWHM. The green OLED shows a FWHM reduction of over 2.5 times, reducing from a 101.6 nm to 40.4 nm. Similarly, the FWHM is reduced nearly 2 times, from 87.0 nm to 46.7 nm. From the design example presented in Example 1 and Example 2, the resulting emission spectrum of the optimized MCOLED is plotted in FIGS. 13A and 13B.

Microcavity OLED Structures for Light Field Display

A microcavity OLED device refers to the materials of an OLED structure bound by two reflective surfaces, or mirrors. Compared to a metallic mirror, which is bound to a maximum reflectance by absorption, the reflectance of a distributed Bragg Reflector, DBR, can be adjusted, allowing the designer to tune the output characteristics of the microcavity. By fine-tuning the DBR structure to achieve the optimum optical path length for the MCOLED, the microcavity effects of the device are advantageous for use in a light-field display. For a metasurface or diffractive based optical element, it is the reduction in the output spectrum for each OLED. For a refractive lens, it is the reduction in the output angle and therefore control of the intensity profile.

Different configurations of MCOLDs, coupled with a DBR, can be conceived for different applications. Each of these configurations will have their own specific design requirements which can be simulated using the FDTD simulation method of the present disclosure.

FIG. 1 illustrates an illustrative embodiment where each subpixel is driven by a single, dedicated pixel driver circuit. For example, FIG. 1 illustrates three separate pixel driving circuits 32 driving three separate subpixels 16-30; in the illustration, like elements are denoted with R, G, and B, and reference to a numerical element of the figure refers to each of the like elements, as they all operate in the same fashion.

As illustrated in FIG. 1, pixel driver circuits 32, such as TFT backplanes, connect to cathodes 30 through vias 34 in a substrate 38. The cathodes double as one of the optical microcavity reflective surfaces. On top of the cathodes are electron transport layers 26, emission layers 24, hole transport layers 22, hole injection layers 20, anodes 18 and fill layers 16; these elements comprise the three OLEDs. On top of the fill layers 16 are distributed Bragg reflectors (DBRs), light propagating reflective surfaces consisting of dielectric layers alternating between low indices of refraction 12 and high indices of refraction 14. The length of the optical microcavities is shown as $L_i$ and the thickness of the connected DBRs is shown as $d_{DBR}$. The DBRs emit one or more substantially collimated, manipulated, or tuned light beams, and the light beams propagate through a directional optical guiding surface 36. The directional optical guiding surface directs the light beam at specific spatial wave vectors. Where each pixel uses a dedicated DBR, the DBR is operatively tuned for each output wavelength.

Figure 2:
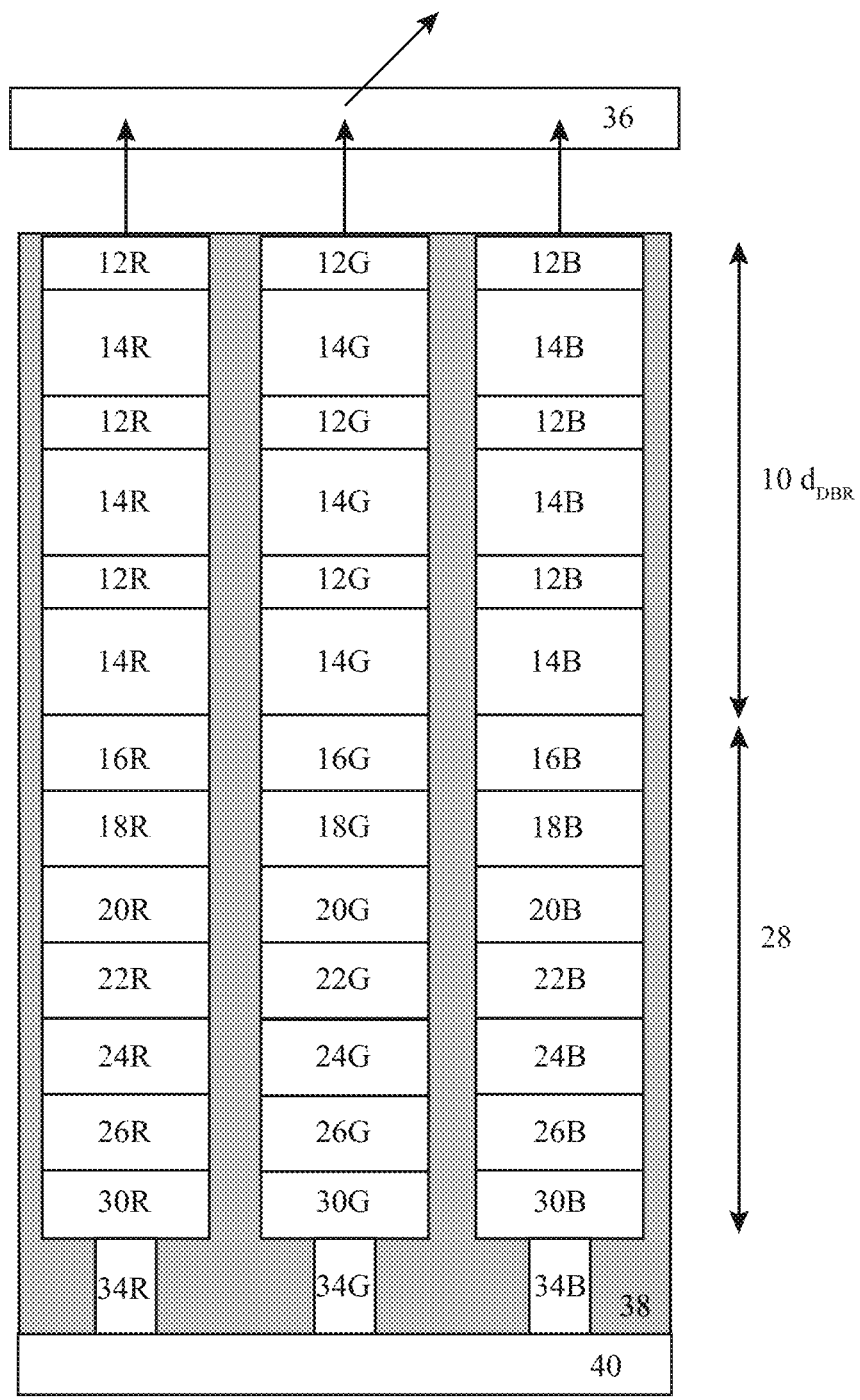
FIG. 2: illustrates an alternate directional pixel configuration applying microcavity OLED structures for use in a light field display.

FIG. 2 illustrates another embodiment where one pixel driving circuit drives a plurality of subpixels. Such a configuration can be used for, but is not limited to, a grayscale display. For example, FIG. 2 illustrates one pixel driving circuit 40 driving three separate subpixels 16-30; in the illustration, like elements are denoted with R, G, and B, and reference to a numerical element of the figure refers to each of the like elements, as they all operate in the same fashion.

As illustrated in FIG. 2, the pixel driving circuit 40 connects to cathodes 30 through vias 34 in a substrate 38. The cathodes double as one of a plurality of reflective surfaces. On top of the cathodes are electron transport layers 26, emission layers 24, hole transport layers 22, hole injection layers 20, anodes 18 and fill layers 16; these elements comprise the three OLEDs. On top of the fill layers 16 are DBRs, consisting of dielectric layers alternating between low indices of refraction 12 and high indices of refraction 14. The length of the optical microcavities is shown as $L_i$ and thickness of the connected DBRs is shown as $d_{DBR}$. The DBRs emit one or more substantially collimated, manipulated, or tuned light beams, and the light beams propagate through a directional optical guiding surface 52. The directional optical guiding surface directs the light beam at a specific spatial wave vector. Where each pixel uses a dedicated DBR, the DBR is operatively tuned for each output wavelength.

Figure 3:
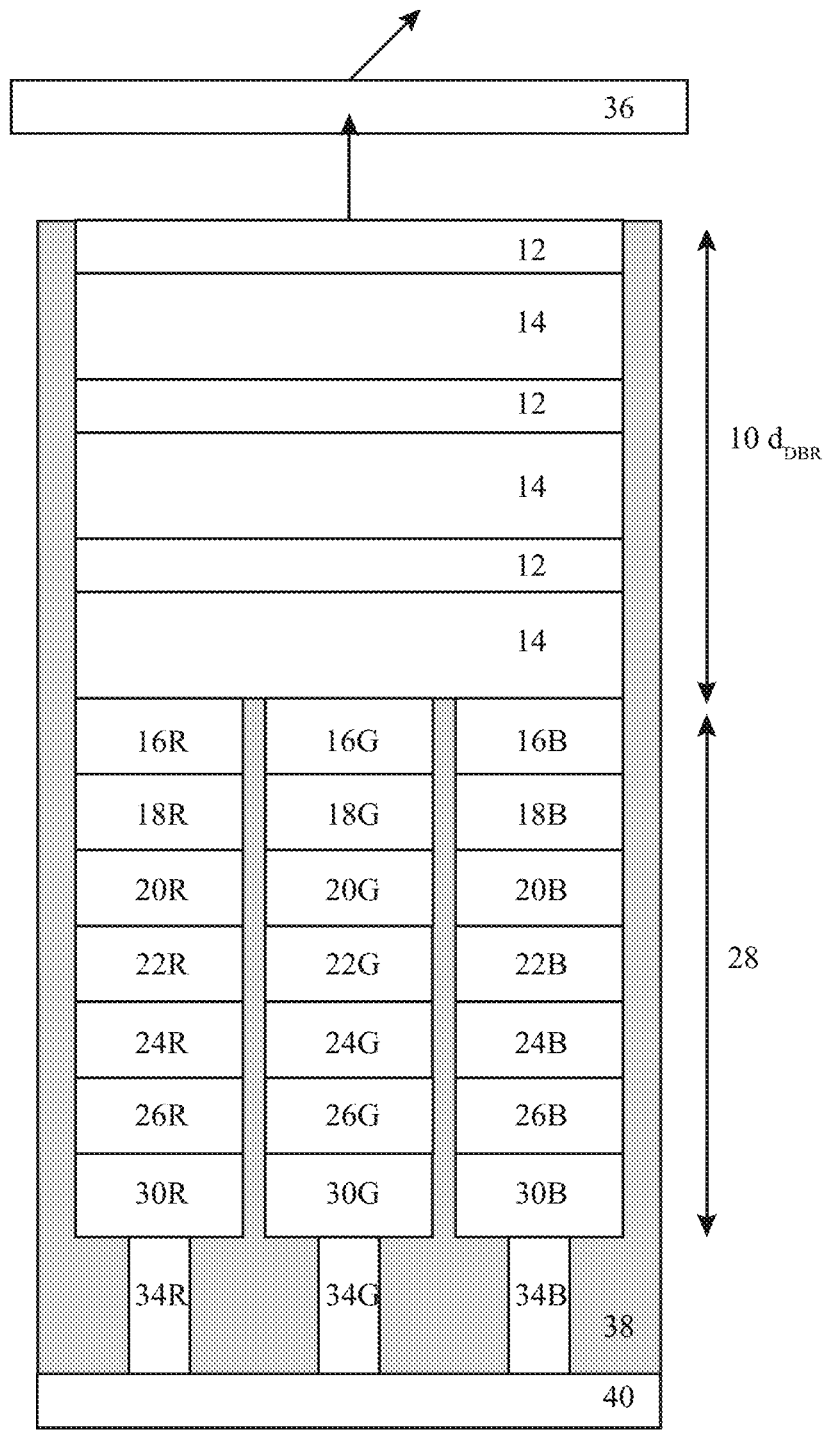
FIG. 3: illustrates a further alternate directional pixel configuration applying microcavity OLED structures for use in a light field display.

FIG. 3 illustrates another embodiment, where one pixel driving circuit drives a plurality of subpixels 16-30, which share one or more optical microcavity light propagating reflective surfaces. Such a configuration can be used for, but is not limited to, a grayscale display. For example, FIG. 3 illustrates one pixel driving circuit 40 driving three separate subpixels which share a reflective surface 12-14; in the illustration, like elements are denoted with R, G, and B, and reference to a numerical element of the figure refers to each of the like elements, as they all operate in the same fashion.

As illustrated in FIG. 3, the pixel driving circuit 40 connects to cathodes 30 through vias 34 in a substrate 38. The cathodes double as one of a plurality of reflective surfaces. On top of the cathodes are electron transport layers 26, emission layers 24, hole transport layers 22, hole injection layers 20, anodes 18 and fill layers 16; these elements comprise the three OLEDs. On top of the three separate fill layers 16 is a single, shared, DBR, consisting of dielectric layers alternating between low indices of refraction 12 and high indices of refraction 14. The length of the optical microcavities is shown as $L_i$ and thickness of the connected DBRs is shown as $d_{DBR}$. The DBR emits one or more substantially collimated, manipulated, or tuned light beams, and the light beams propagate through a directional optical guiding surface 36. The directional optical guiding surface directs the light beam at a specific spatial wave vector. Where a plurality of pixels share a DBR, the DBR operates as a broadband structure with a reflectance covering the entire spectral range.

Figure 4:
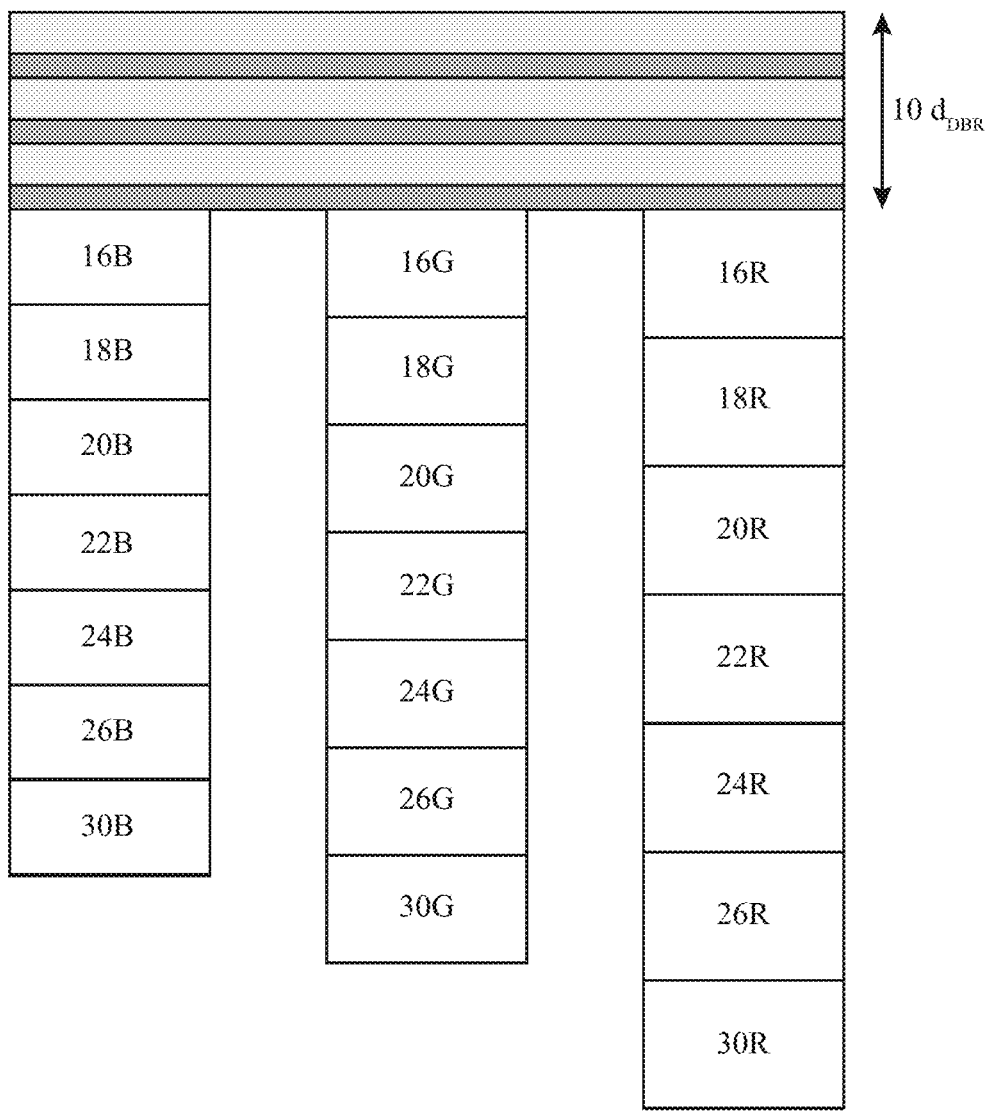
FIG. 4: illustrates the separate RGB OLEDs with a common DBR above the OLED materials, separated by a filler layer as needed to create the proper optical path length, using a mode of m for RGB OLEDs.

FIG. 4 illustrates a plurality of subpixels, but the subpixels share one or more optical microcavity light propagating reflective surfaces. Such a configuration can be used for, but is not limited to, a grayscale display. For example, FIG. 4 illustrates three separate subpixels which share a reflective surface 12-14; in the illustration, like elements are denoted with R, G, and B, and reference to a numerical element of the figure refers to each of the like elements, as they all operate in the same fashion. The subpixels are scaled to represent their respective wavelength, $\lambda_i$ where i denotes the specific subpixel, red, blue or green (RGB), for a mode of m=3.

As illustrated in FIG. 4, the cathodes double as one of a plurality of reflective surfaces. On top of the cathodes are electron transport layers 26, emission layers 24, hole transport layers 22, hole injection layers 20, anodes 18 and fill layers 16; these elements comprise the three OLEDs. On top of the three separate fill layers 16 is a single, shared, DBR, consisting of dielectric layers alternating between low indices of refraction 12 and high indices of refraction 14. The length of the optical microcavities is shown as $L_i$ thickness of the connected DBRs is shown as $d_{DBR}$. The DBR emits one or more substantially collimated, manipulated, or tuned light beams, and the light beams propagate through a directional optical guiding surface (36). The directional optical guiding surface directs the light beam at a specific spatial wave vector. Where a plurality of pixels share a DBR, the DBR operates as a broadband structure with a reflectance covering the entire spectral range.

Figure 5:
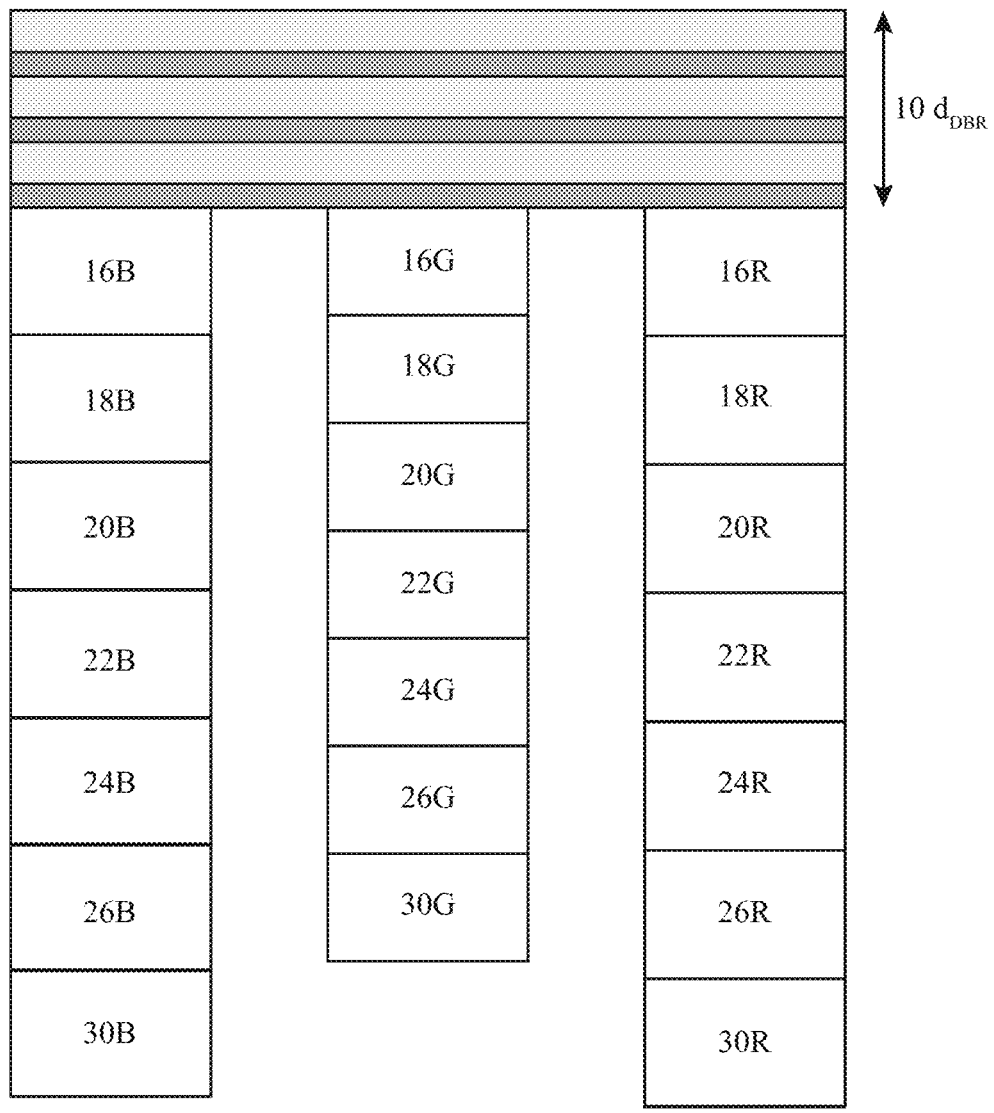
FIG. 5: illustrates the separate RGB OLEDs with a common DBR above the OLED materials, separated by a filler layer as needed to create the proper optical path length, using a mode of m for RG OLEDs and a mode of m+1 for the B OLED.

FIG. 5 illustrates a plurality of subpixels, but the subpixels share one or more optical microcavity light propagating reflective surfaces. Such a configuration can be used for, but is not limited to, a grayscale display. For example, FIG. 4 illustrates three separate subpixels 16-30, which share a reflective surface 12-14; in the illustration, like elements are denoted with R, G, and B, and reference to a numerical element of the figure refers to each of the like elements, as they all operate in the same fashion. The subpixels are scaled to represent their respective wavelength, $\lambda_i$, where i denotes the specific subpixel, red, blue or green (RGB), for a mode of m for red and green and a mode of m+1 for blue, bringing it closer in scale to that of the red subpixel.

As illustrated in FIG. 5, the cathodes double as one of a plurality of reflective surfaces. On top of the cathodes are electron transport layers 26, emission layers 24, hole transport layers 22, hole injection layers 20, anodes 18 and fill layers 16; these elements comprise the three OLEDs. On top of the three separate fill layers 16 is a single, shared, DBR, consisting of dielectric layers alternating between low indices of refraction 12 and high indices of refraction 14. The length of the optical microcavities is shown as $L_i$ and thickness of the connected DBRs is shown as $d_{DBR}$. The DBR emits one or more substantially collimated, manipulated, or tuned light beams, and the light beams propagate through a directional optical guiding surface 36. The directional optical guiding surface directs the light beam at a specific spatial wave vector. Where a plurality of pixels which share a DBR, the DBR operates as a broadband structure with a reflectance covering the entire spectral range.

Figure 6:
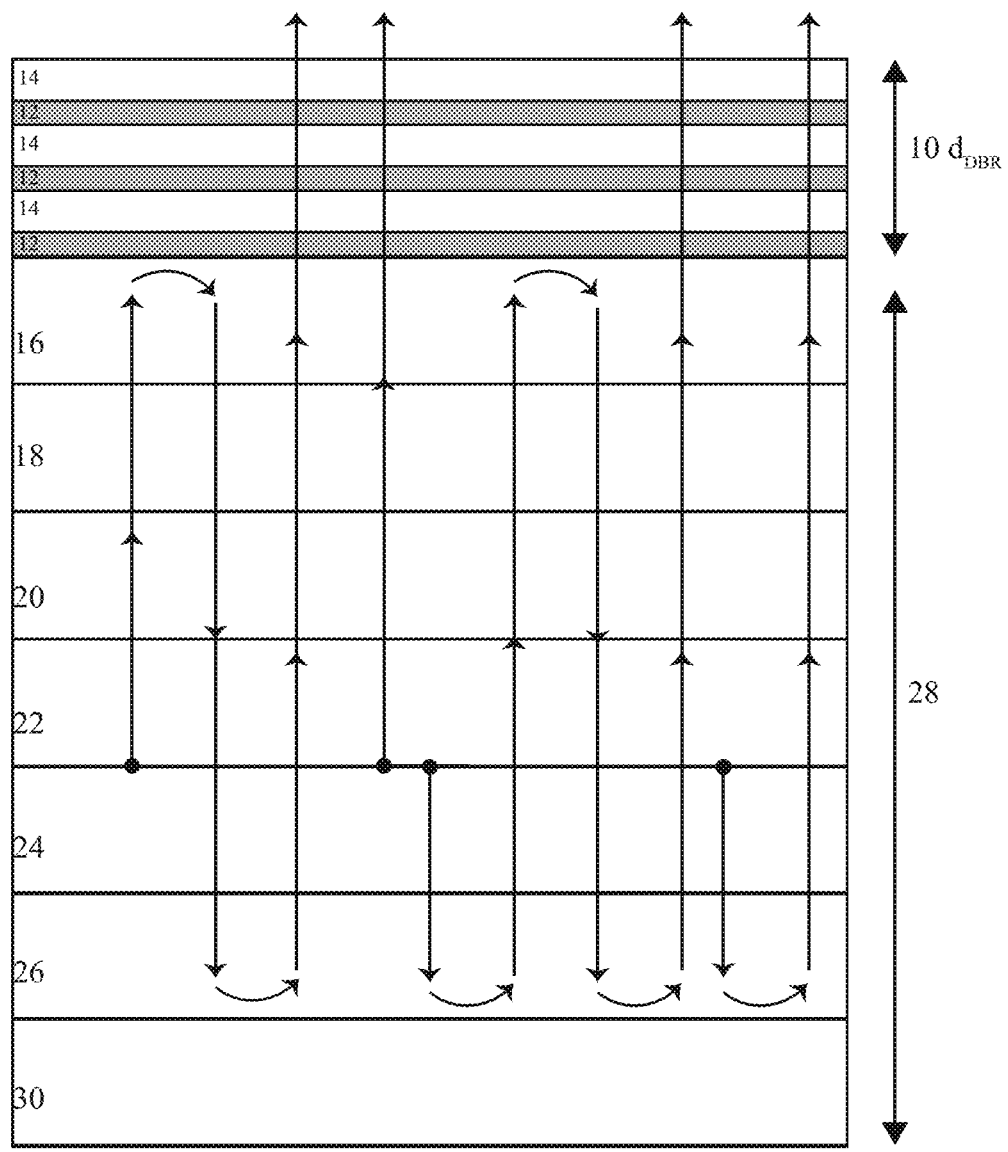
FIG. 6: is a schematic illustration of a microcavity OLED indicating the passage of light through an OLED structure, according to the disclosure.

FIG. 6 illustrates a schematic of an OLED device including a luminescent region (also referred to as an OLED) and a DBR. One of skill in the art will understand that DBR may be used for increasing the upper direction reflectivity. However, the DBR of the configuration of FIG. 7 results in a narrow, more suitable wavelength peak. The luminescent region may include an anode 18, cathode 30, electron transport layer 26, emission layer 24, hole transport layer 22, hole injection layer 20, and a filler layer 16. The DBR structure associated with the luminescent region comprises stacked pairs of dielectric materials; a layer with a low index of refraction 12 and a layer with a higher index of refraction 14. FIG. 6 could also be shown with the DBR structure in which the order of the alternating dielectric materials could be reversed with the first layer the filler layer 16 being the material with the higher refractive index 14.

The emissive theory of the organic light-emitting diodes is based on injections of electrons in holes, while come from the anode 18 and the cathode 30. After recombining within the EML 24, the energy is transferred into visible light. The luminescent region may provide a narrow emission spectrum band due at least in part to the microcavity effect between the reflective cathode 30 and the anode 18. This microcavity effect and resultant narrow emission spectrum may contribute to efficient phosphor excitation as compared to conventional ITO anodes. The direction of the pathway of light through the OLED structure and DBR is depicted by the arrows.

Figure 9:
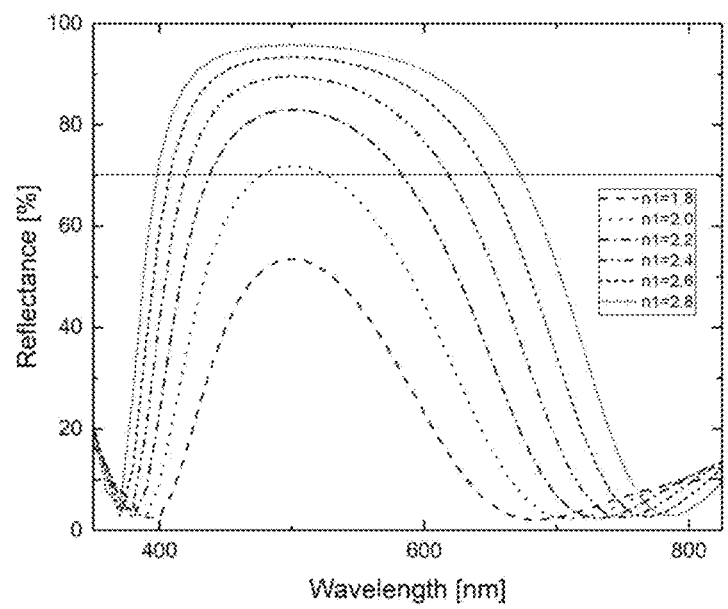
FIG. 9: illustrates a graphical representation of the theoretical reflectance for a 3 period DBR designed with a Bragg wavelength of 500 nm, demonstrating the increased reflectance and stopband width obtained by increasing the refractive index contrast. In the graphical example presented, $n_1$ is set to 1.445, and $n_2$ is varied in the range of 1.8-2.8.

FIG. 9 illustrates a graphical representation of the theoretical reflectance for a 3 period DBR designed with a Bragg wavelength of 500 nm, demonstrating the increased reflectance and stopband width obtained by increasing the refractive index contrast. In the graphical example presented, $n_1$ is set to 1.445, and $n_2$ is varied in the range of 1.8-2.8.

EXAMPLES

Example 1

For the design of a MCOLED, an example of a red OLED where $\lambda_R$=630 nm is considered, in which the overall design contains a DBR which is continuous across RGB sub-pixels and has $\lambda_{Bragg}$=500 nm.

The initial red OLED design 42 contains 30 nm of Alq3, 30 nm of Alq3 doped with 2% w/w Rubrene, 20 nm of NPD, and 30 nm of m-MTDATA, with an anode of ITO and an aluminum cathode, with a 1 nm thick LiF coating. Therefore, $L_{Organics}$=274.4 nm from Equation (8). The emission spectrum from the as-designed OLED is shown in FIG. 13A.

The reflectance spectrum of the DBR must have a stopband width equivalent to the full output for the red, green, and blue OLEDs. While many materials may be used for a DBR, $TiO_2$ and $SiO_2$ have a large refractive index contrast and the deposition of these materials is common and well known. Since the stopband is not evenly distributed around $\lambda_{Bragg}$, the refractive index values for $TiO_2$ and $SiO_2$ were used in a script based on a transfer matrix model to determine the DBR reflectance profile. The expected emission profile for the RGB OLEDs is shown in FIG. 8 beneath the expected reflectance profile for a $\Lambda$=3 DBR with $\lambda_{Bragg}$=475 nm, 500 nm, and 525 nm using $TiO_2$ and $SiO_2$, showing that $\lambda_{Bragg}$=500 nm fully distributes the stopband across the RGB OLEDs. Using Equations (5) and (6), noting the refractive indices of $SiO_2$ and $TiO_2$ at 500 nm are 1.449 and 2.515, the required layer thicknesses are 86.3 nm and 49.7 nm, respectively, giving=86.4 and =171 nm 46.

From Equation (10), the penetration depth for an Aluminum cathode at $\lambda_R$=630 nm is found to be $L_{Cathode}$=21.6 nm and setting $L_{DBR}$=630 nm, Equation (7) gives $L_R$=925.9 nm. Using Equation (1), it is determined that the closest mode number to satisfy Equation (1) with $\lambda_R$=630 nm is m=3.

To find the actual penetration depth at $\lambda_R$, FDTD is used as described previously. Using a model of the DBR immersed in air, as well as a point monitor and a plane wave source, the accumulated phase for the reflection from the DBR is determined. Calculating the phase accumulation for the reflection from an ideal metallic reflector $$\left(\phi = \frac{2\pi d}{\lambda}\right)$$

the phase change in the DBR can be calculated, from which the penetration depth can be determined. For $\lambda_R$, the penetration depth in the DBR 50 is determined to be 658 nm.

Using $L_{DBR}$=658 nm, with m=3, The material thicknesses of the OLED are for the microcavity design are altered to 22 nm of Alq3, 22 nm of Alq3 doped with 2% w/w Rubrene, 15 nm of NPD, and 45 nm of m-MTDATA, to give $L_{Organics}$=263.4 nm, resulting in an m=3 mode of 629 nm 52.

With an initial design for $\lambda_R$ defined, the MCOLED structure 52 can be defined in Lumerical FDTD solution. The simulation is created using a custom script, created in Lumerical's scripting language, adding the functionality to vary each material thickness individually during parameter sweeps or optimizations 54. In this case, the thickness of the ITO 58 is the varied quantity, with a figure of merit (FOM) defined as the maximum electric field intensity at $\lambda_R$. The resulting spectrum of the optimization is plotted with the experimentally measured MCOLED results in FIG. 13A, using the optimized value of ITO 62 of 45 nm.

To fabricate the MCOLED 64, the DBR is deposited onto a glass substrate via sputtering, followed by the ITO. Then the OLED materials, the LiF, and the aluminum are evaporated to finalize the OLED. Generally, some additional capping is added after the cathode. The same process is used to create the OLED, minus the deposition of the DBR.

For the fabrication of a top-emitting MCOLED 64, a similar process as previously described can be used where a silicon, glass, or other substrate can be used. The metal cathode and organic materials of the OLED are deposited using evaporation. This is followed by sputtering of the ITO anode and the DBR materials.

Example 2

For the design of a MCOLED, an example of a green OLED where $\lambda_G$=540 nm is considered, in which the overall design contains a DBR which is continuous across RGB sub-pixels and has $\lambda_{Bragg}$=500 nm as described in the previous example.

The initial green OLED design 42 contains 50 nm of Alq3, 20 nm of NPD, and 30 nm of m-MTDATA, with an anode of 45 nm ITO, giving $L_{Organics}$=261.3 nm from Equation (8). The emission spectrum from the as-designed OLED is shown in FIG. 13B.

From Equation (10), the penetration depth for an Aluminum cathode at $\lambda_G$=540 nm is found to be $L_{Cathode}$ 18.5 nm and setting $L_{DBR}$=540 nm, Equation (7) gives $L_G$=819.8 nm. Using Equation (1), it is determined that the closest mode number to satisfy Equation (1) with $\lambda_G$=540 nm, m=3.

To find the actual penetration depth at $\lambda_G$, FDTD is used as described previously. Using a model of the DBR immersed in air, as well as a point monitor and a plane wave source, the accumulated phase for the reflection from the DBR is determined. Calculating the phase accumulation for the reflection from an ideal metallic reflector $$\left(\phi = \frac{2\pi d}{\lambda}\right)$$

the phase change in the DBR can be calculated, from which the penetration depth can be determined. For $\lambda_G$, the penetration depth in the DBR 50 is determined to be 489.6 nm.

Using $L_{DBR}$=489.6 nm, with m=3, The material thicknesses of the OLED are for the microcavity design are altered to 30 nm of Alq3, 15 nm of NPD, and 20 nm of m-MTDATA, and the ITO thickness is increased to 100 nm to give $L_{Organics}$=304.1 nm, resulting in an m=3 mode of 541 nm 52.

With an initial design for $\lambda_G$ defined, the MCOLED structure 52 can be defined in Lumerical FDTD solution. The simulation is created using a custom script, created in Lumerical's scripting language, adding the functionality to vary each material thickness individually during parameter sweeps or optimizations 54. In this case, the thickness of the organic materials is the varied quantity 56, with a figure of merit (FOM) defined as the maximum electric field intensity at $\lambda_G$. The resulting spectrum of the optimization is plotted with the experimentally measured MCOLED results in FIG. 13B, where the final thicknesses 62 used for fabrication 64 are 34 nm of Alq3, 13.6 nm of NPD, and 20.4 nm of m-MTDATA The disclosures of all patents, patent applications, publications and database entries referenced in this specification are hereby specifically incorporated by reference in their entirety to the same extent as if each such individual patent, patent application, publication and database entry were specifically and individually indicated to be incorporated by reference.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

REFERENCE LIST

[01] J. G. C. Veinot, H. Yan, S. M. Smith, J. Cui, Q. Huang, and T. J. Marks, "Fabrication and properties of organic light-emitting nanodiode arrays," Nano Letters, vol. 2, no. 4, pp. 333-335, 2002.

[02] H. Yamamoto, J. Wilkinson, J. P. Long, K. Bussman, J. A. Christodoulides, and Z. H. Kafafi, "Nanoscale organic light-emitting diodes," Nano Letters, vol. 5, no. 12, pp. 2485-2488, 2005. PMID: 16351200.

[03] E. F. Schubert, N. E. J. Hunt, M. Micovic, R. J. Malik, D. L. Sico, A. Y. Cho, and G. J. Zydzik, "Highly Efficient Light-Emitting Diodes with Microcavities," Science, new series, vol. 265, no. 5174, pp. 943-945, 1994.

[04] G. Björk, Y. Yamamoto, and H. Heitmann, Spontaneous Emission Control in Semiconductor Microcavities, pp. 467-501. Boston, Mass.: Springer US, 1995.

[05] A. Dodabalapur, L. J. Rothberg, R. H. Jordan, T. M. Miller, R. E. Slusher, and J. M. Phillips, "Physics and applications of organic microcavity light emitting diodes," Journal of Applied Physics, vol. 80, no. 12, pp. 6954-6964, 1996.

[06] B. Masenelli, A. Gagnaire, L. Berthelot, J. Tardy, and J. Joseph, "Controlled spontaneous emission of a tri(8-hydroxyquinoline) aluminum layer in a microcavity," Journal of Applied Physics, vol. 85, no. 6, pp. 3032-3037, 1999.

[07] M. S. Skolnick, T. A. Fisher, and D. M. Whittaker, "Strong coupling phenomena in quantum microcavity structures," Semiconductor Science and Technology, vol. 13, no. 7, p. 645, 1998.

[08] V. Savona, L. C. Andreani, P. Schwendimann, and A. Quattropani, "Quantum well excitons in semiconductor microcavities: unified treatment of weak and strong coupling regimes," Solid State Communications, vol. 93, no. 9, pp. 733-739, 1995.

[09] C. W. Wilmsen, H. Temkin, and L. A. Coldren, Vertical-Cavity Surface-Emitting Lasers. July 1999. Lumerical, "FDTD solutions, ver. 8.18.1365," 2017.

[10] Henderson, T. (1996-2018). Nodes and Antinodes. Retrieved from http://www.physicsclassroom.com.

[11] H. Sugawara, K. Itaya, and G. ichi Hatakoshi, "Hybrid-type ingaalp/gaas distributed bragg reflectors for ingaalp light-emitting diodes," Japanese Journal of Applied Physics, vol. 33, no. 11R, p. 6195, 1994.

[12] A. B. Djurišić and A. D. Rakić, "Organic microcavity light-emitting diodes with metal mirrors: dependence on the emission wavelength on the viewing angle," Appl. Opt., vol. 41, pp. 7650-7656, December 2002.

[13] S. Tokito, T, Tsutsui, and Y. Taga, "Microcavity organic light-emitting diodes for strongly directed pure red, green, and blue emissions," Journal of Applied Physics, vol. 86, no. 5, pp. 2407-2411, 1999.

[14] Y. Karzazi, "Organic Light Emitting Diodes: Devices and applications," Journal of Materials and Environmental Science, vol. 5, no. 1, pp. 1-12, 2014.

[15] F. Aieta, M. A. Kats, P. Genevet, F. Capasso, "Multiwavelength achromatic metasurfaces by dispersive phase compensation", Science, vol. 347, no. 1342, 2015.

The embodiments of the invention in which an exclusive property or privilege is claimed are defined as follows:

1. A method of obtaining fabrication specifications and fabricating a microcavity OLED tuned to emit a specified wavelength of light, the microcavity OLED comprising material layers including microcavity layers and reflective layers, wherein said microcavity layers and reflective layers are configured to provide a cathode and an anode with organic layers disposed there between, an optional filler layer and a Distributed Bragg Reflector (DBR) of the microcavity OLED, the method comprising the computer-implemented steps of:

calculating optical path length and mirror reflectance approximations for the cathode and DBR for a given set of microcavity OLED emission characteristics;

applying a FDTD simulation to determine mirror penetration depths required for the microcavity OLED to emit the specified wavelength of light using the optical path length and mirror reflectance approximations;

applying a FDTD simulation to parameterize one or more of the material layers to be used to form the microcavity layers; and using the results of the FDTD simulation to parameterize one or more of the material layers to determine the optimized thicknesses for the one or more materials layers and thereby provide fabrication specifications for the microcavity OLED.

2. The method of claim 1, wherein the microcavity layers comprise organic layers.

3. The method of claim 2, wherein applying a FDTD simulation to parameterize the organic layers is based on a particle swarm optimization protocol.

4. The method of claim 1, wherein the microcavity layers comprise anode layers.

5. The method of claim 1, wherein the microcavity layers comprise filler layers.

6. The method of claim 1, wherein applying a FDTD simulation to determine mirror penetration depths is based on a transfer matrix protocol.

7. The method of claim 1, further comprising fabricating the microcavity OLED.

8. The method of claim 7, wherein the DBR has a Bragg wavelength configured for use with the microcavity OLED tuned to emit a specified wavelength of light, and comprises sublayers of alternating dielectric material, each sublayer's thickness providing an optical path length equal to one quarter of the Bragg wavelength.

9. The method of claim 8, wherein the microcavity OLED is top-emitting.

10. The method of claim 8, wherein the microcavity OLED is tuned to emit red, green or blue light.

11. The method of claim 8, wherein the DBR comprises three pairs of alternating titanium dioxide and silicon dioxide sublayers, has a Bragg wavelength of 500 nm and wherein each titanium dioxide sublayer is about 50 nm thick and each silicon dioxide sublayer is about 86 nm thick.

\* \* \* \* \*

UNITED STATES PATENT AND TRADEMARK OFFICE
CERTIFICATE OF CORRECTION

PATENT NO. : 10,651,424 B2
APPLICATION NO. : 16/409281
DATED : May 12, 2020
INVENTOR(S) : Peckham et al.

Page 1 of 1

It is certified that error appears in the above-identified patent and that said Letters Patent is hereby corrected as shown below:

On the Title Page

Item (72), should read --Jordan Peckham, Portugal Cove-St. Phillips, (CA)--.

Signed and Sealed this
Eighteenth Day of August, 2020

Andrei Iancu
*Director of the United States Patent and Trademark Office*